US010234190B2

United States Patent
Wantland et al.

(10) Patent No.: US 10,234,190 B2
(45) Date of Patent: Mar. 19, 2019

(54) LOCKING ASSEMBLIES FOR DOOR-IN-DOOR REFRIGERATOR APPLIANCES

(71) Applicant: Haier US Appliance Solutions, Inc., Wilmington, DE (US)

(72) Inventors: Louis A. Wantland, Louisville, KY (US); Bagawathkumar Chellappan, Louisville, KY (US)

(73) Assignee: Haier US Appliance Solutions, Inc., Wilmington, DE (US)

( * ) Notice: Subject to any disclaimer, the term of this patent is extended or adjusted under 35 U.S.C. 154(b) by 22 days.

(21) Appl. No.: 15/369,994

(22) Filed: Dec. 6, 2016

(65) Prior Publication Data

US 2018/0156529 A1  Jun. 7, 2018

(51) Int. Cl.
  *F25D 23/02* (2006.01)
  *F25D 23/08* (2006.01)
  *E05B 65/00* (2006.01)

(52) U.S. Cl.
  CPC ......... *F25D 23/025* (2013.01); *F25D 23/087* (2013.01); *E05B 65/0042* (2013.01); *F25D 23/02* (2013.01); *Y02B 40/34* (2013.01)

(58) Field of Classification Search
  CPC ......... F25D 2323/021; F25D 2323/023; F25D 23/025; F25D 23/028; Y10S 292/21; Y10S 292/71
  See application file for complete search history.

(56) References Cited

U.S. PATENT DOCUMENTS

| 2,309,049 | A | * | 1/1943 | Curtiss, Jr. .......... E05B 65/0042 |
| | | | | 126/197 |
| 5,966,963 | A | | 10/1999 | Kovalaske |
| 7,254,958 | B2 | | 8/2007 | Kim et al. |
| 7,607,743 | B2 | | 10/2009 | Jang |
| 7,976,113 | B2 | | 7/2011 | Gwak |
| 8,075,072 | B2 | | 12/2011 | Gwak |
| 8,182,055 | B2 | | 5/2012 | Yun et al. |
| 8,186,782 | B2 | | 5/2012 | Choi |
| 8,287,061 | B2 | | 10/2012 | Ha |
| 8,388,078 | B2 | | 3/2013 | Kwon et al. |

(Continued)

FOREIGN PATENT DOCUMENTS

| KR | 20090049220 A | 5/2009 |
| WO | WO2006011116 A1 | 2/2006 |

(Continued)

*Primary Examiner* — Matthew W Ing
(74) *Attorney, Agent, or Firm* — Dority & Manning, P.A.

(57) ABSTRACT

A locking assembly for a refrigerator appliance having inner and outer doors includes a catch mounted to an inner door of the refrigerator. The catch includes a body having a support surface and a locking member. The support surface may be positioned between an outer surface of the inner door and an inner surface of the outer door. The locking assembly also includes a latch coupled to the outer door and operable to engage the latch member. In addition, the locking assembly includes a magnet positioned on the support surface, and the magnet is operable to exert a magnetic bias on the outer door towards the inner door along the transverse direction to compress a gasket that is operable to seal against the outer surface of the inner door or the inner surface of the outer door.

12 Claims, 17 Drawing Sheets

(56) References Cited

U.S. PATENT DOCUMENTS

| | | |
|---|---|---|
| 8,408,664 B2 | 4/2013 | Park et al. |
| 8,424,985 B2 | 4/2013 | Kwon et al. |
| 8,752,918 B2 | 6/2014 | Kang |
| 8,851,590 B2 | 10/2014 | Song et al. |
| 8,905,501 B2 | 12/2014 | Lee et al. |
| 9,091,476 B2 | 7/2015 | Kim et al. |
| 9,151,534 B2 | 10/2015 | Lee et al. |
| 9,322,591 B2 | 4/2016 | Oh et al. |
| 2004/0075222 A1* | 4/2004 | Wegert ............... E05C 19/161 277/629 |
| 2005/0144970 A1 | 7/2005 | Cho et al. |
| 2006/0226751 A1 | 10/2006 | Park |
| 2008/0168794 A1 | 7/2008 | Cho et al. |
| 2011/0043089 A1* | 2/2011 | Chubb ............... A47F 3/0434 312/405.1 |
| 2011/0315694 A1 | 12/2011 | Kurita et al. |
| 2012/0038257 A1 | 2/2012 | Kim et al. |
| 2013/0119845 A1 | 5/2013 | Seo et al. |
| 2014/0132142 A1 | 5/2014 | Kim et al. |
| 2014/0132143 A1 | 5/2014 | Kim et al. |
| 2014/0132144 A1 | 5/2014 | Kim et al. |
| 2014/0132145 A1 | 5/2014 | Lee et al. |
| 2014/0285082 A1 | 9/2014 | Choi et al. |
| 2015/0040604 A1 | 2/2015 | You et al. |
| 2015/0069900 A1 | 3/2015 | Lim et al. |
| 2015/0176886 A1 | 6/2015 | Lee et al. |
| 2015/0233629 A1 | 8/2015 | Choi et al. |
| 2015/0241116 A1 | 8/2015 | Choi et al. |
| 2015/0260443 A1 | 9/2015 | Lee et al. |
| 2016/0040467 A1 | 2/2016 | Hwang |

FOREIGN PATENT DOCUMENTS

| | | |
|---|---|---|
| WO | WO2009083404 A2 | 7/2009 |
| WO | WO2010026247 A1 | 3/2010 |
| WO | WO2010133517 A2 | 11/2010 |
| WO | WO2011064078 A1 | 6/2011 |
| WO | WO2011154342 A2 | 12/2011 |

\* cited by examiner

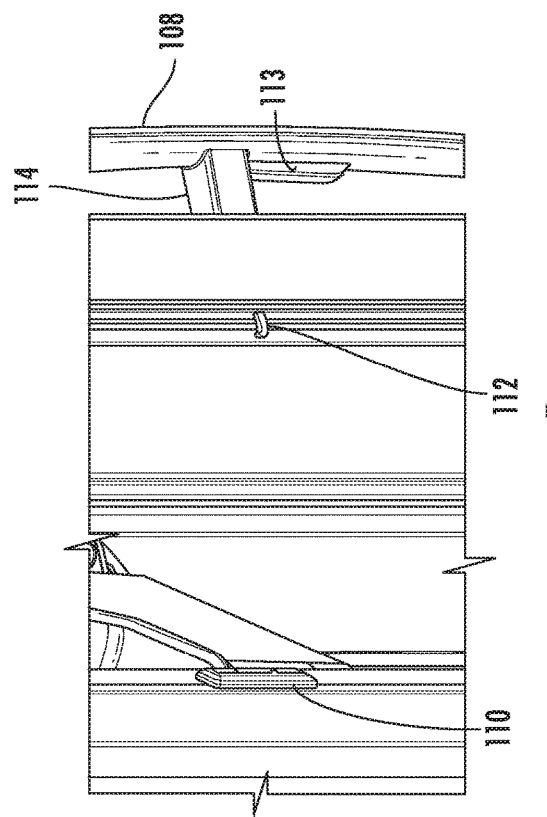
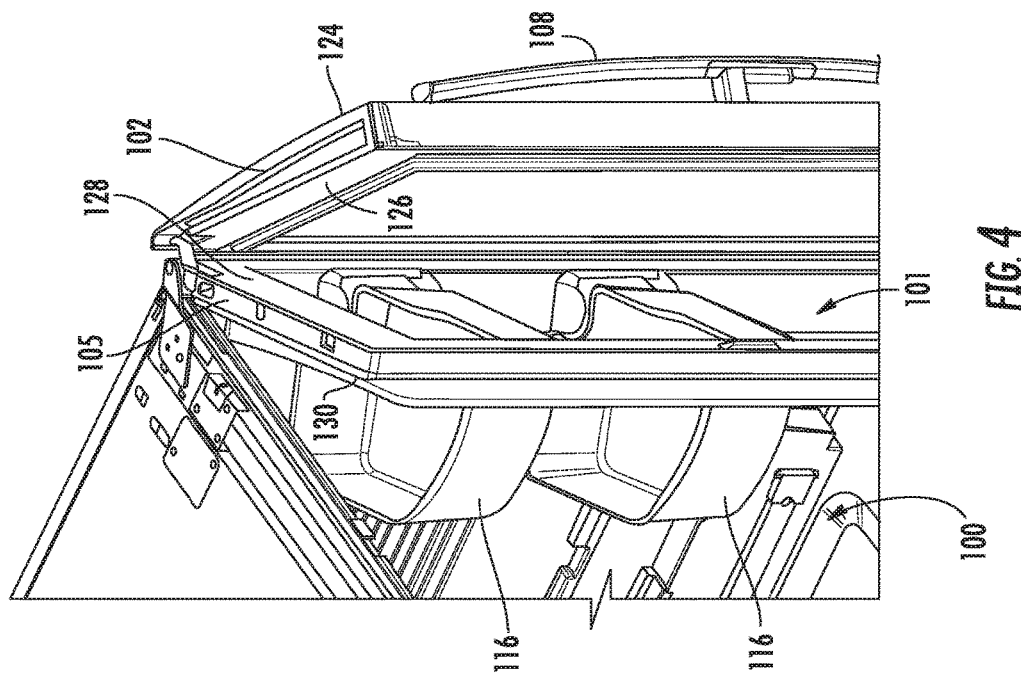

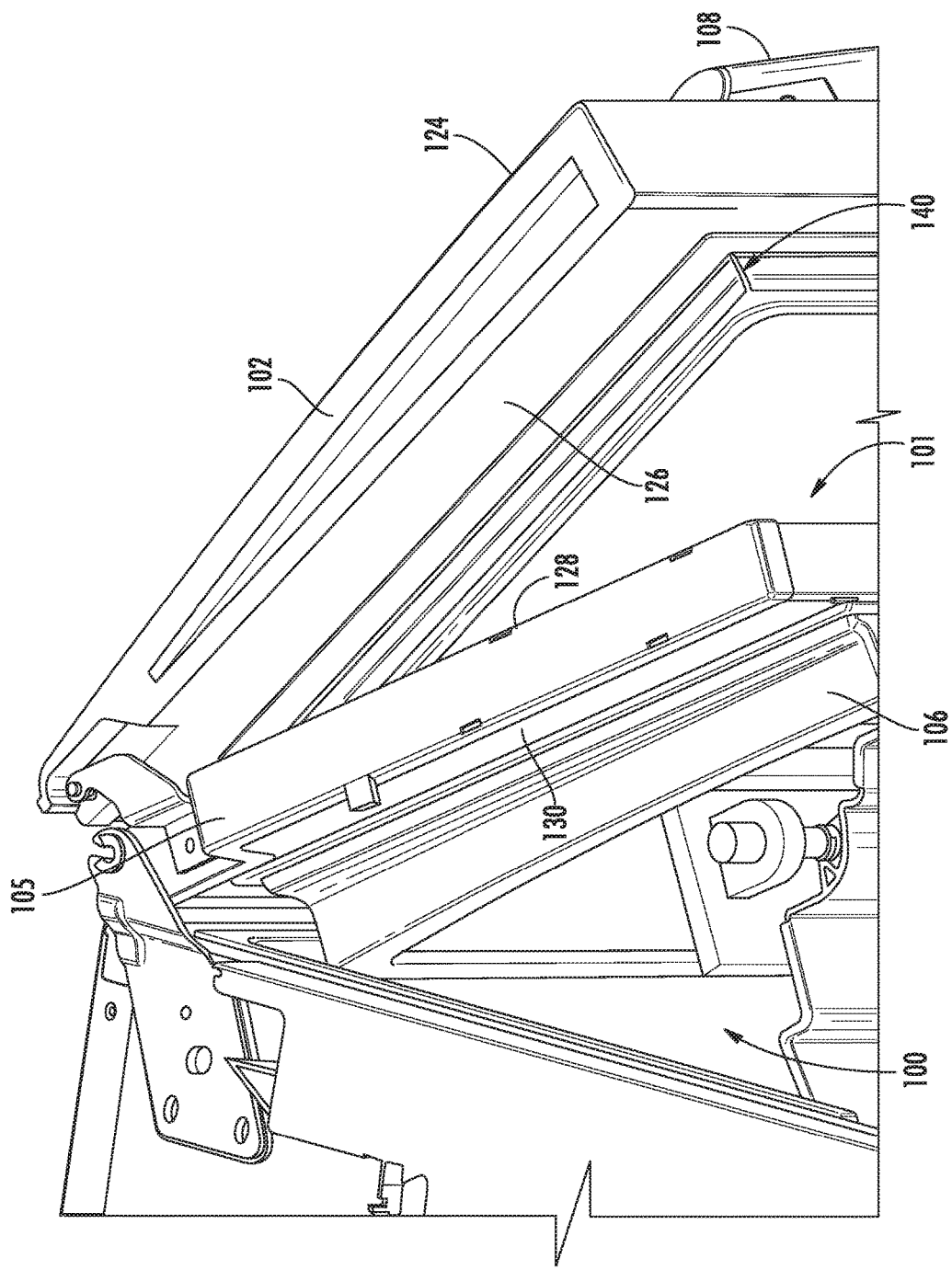

LOCKING ASSEMBLIES FOR DOOR-IN-DOOR REFRIGERATOR APPLIANCES

FIELD OF THE INVENTION

The subject matter of the present disclosure relates generally to refrigerator appliances. In particular, the present subject matter relates to locking assemblies for door-in-door refrigerator appliances.

BACKGROUND OF THE INVENTION

Refrigerator appliances generally include a cabinet that defines a food storage chamber. In addition, refrigerator appliances also generally include a door rotatably hinged to the cabinet to permit selective access to food items stored in the food storage chamber. Certain refrigerator appliances, commonly referred to as door-in-door refrigerator appliances, may also include an outer door rotatably hinged to the inner door to permit selective access to the food storage chamber or, alternatively, a food storage chamber positioned between the inner and outer doors. In addition, door-in-door appliances may also include a gasket positioned on the outer door. Thus, when the outer door is in the closed position, the gasket seals against the inner door to enclose the food storage chamber.

Door-in-door refrigerator appliances also generally include a locking mechanism that allows a user to lock the inner and outer door together. The locking mechanism generally includes a latch positioned on the outer door and a mating catch positioned on the inner door. In operation, the latch engages the catch to lock the outer door to the inner door. However, because of the air-tight or near air-tight seal effected when the outer door is in the closed position, the effect of a hard or even moderate slamming of the outer door is to compress the air within the cabinet so quickly and before it can escape that the compressed air sets up a counter force tending to re-open the outer door.

Accordingly, a door-in-door refrigerator appliance having a locking assembly with features for assisting with closing the outer door would be useful.

BRIEF DESCRIPTION OF THE INVENTION

The present disclosure relates to locking assemblies for refrigerator appliances. Additional aspects and advantages of the invention will be set forth in part in the following description, or may be apparent from the description, or may be learned through practice of the invention.

In one embodiment, a refrigerator appliance defining a vertical direction, a lateral direction, and a transverse direction includes a cabinet defining a food storage chamber. The refrigerator appliance may also include inner and outer doors. The inner door may be rotatably hinged to the cabinet, and may include an inner surface and an outer surface spaced apart from one another along the transverse direction. In addition, the inner door may be movable between an open position and a closed position to permit selective access to the food storage chamber. The outer door maybe rotatably hinged to the inner door, and may include an inner surface and an outer surface spaced apart from one another along the transverse direction. In addition, the outer door may be movable between an open position and a closed position. The refrigerator appliance may also include a gasket operable to seal against the outer surface of the inner door or the inner surface of the outer door. In addition, the refrigerator appliance includes a locking assembly for securing the outer door in the closed position. The locking assembly may include a catch mounted to the inner door, and the catch may comprise a body having a support surface positioned between the outer surface of the inner door and the inner surface of the outer door along the transverse direction. In addition, the body may include a locking member. The locking assembly may also include a latch coupled to the door, and the latch may be operable to engage the locking member. In addition, the locking assembly may include a magnet positioned on the support surface. The magnet may be operable to exert a magnetic bias on the outer door towards the inner door along the transverse direction to compress the gasket.

In another embodiment, a refrigerator appliance defining a vertical direction, a lateral direction, and a transverse direction includes a cabinet defining a food storage chamber. The refrigerator appliance may also include inner and outer doors. The inner door may be rotatably hinged to the cabinet, and may include an inner surface and an outer surface spaced apart from one another along the transverse direction. In addition, the inner door may be movable between an open position and a closed position to permit selective access to the food storage chamber. The outer door maybe rotatably hinged to the inner door, and may include an inner surface and an outer surface spaced apart from one another along the transverse direction. In addition, the outer door may be movable between an open position and a closed position. The refrigerator appliance may also include a gasket operable to seal against the outer surface of the inner door or the inner surface of the outer door. In addition, the refrigerator appliance includes a locking assembly for securing the outer door in the closed position. The locking assembly may include a catch mounted to the inner door, and the catch may comprise a body having a support surface positioned between the outer surface of the inner door and the inner surface of the outer door along the transverse direction. In addition, the body may include a locking member comprising a first locking member and a second locking member. The locking assembly may also include a latch coupled to the door, and the latch may be operable to engage the locking member. In addition, the locking assembly may include a magnet positioned on the support surface. The magnet may be operable to exert a magnetic bias on the outer door towards the inner door along the transverse direction to compress the gasket.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures.

FIG. 4 provides a perspective view of a refrigerator appliance in accordance with embodiments of the present subject matter;

FIG. 5 provides an enlarged view of a portion of FIG. 4;

FIG. 6 provides yet another perspective view of a refrigerator appliance;

DETAILED DESCRIPTION

Figure 1:
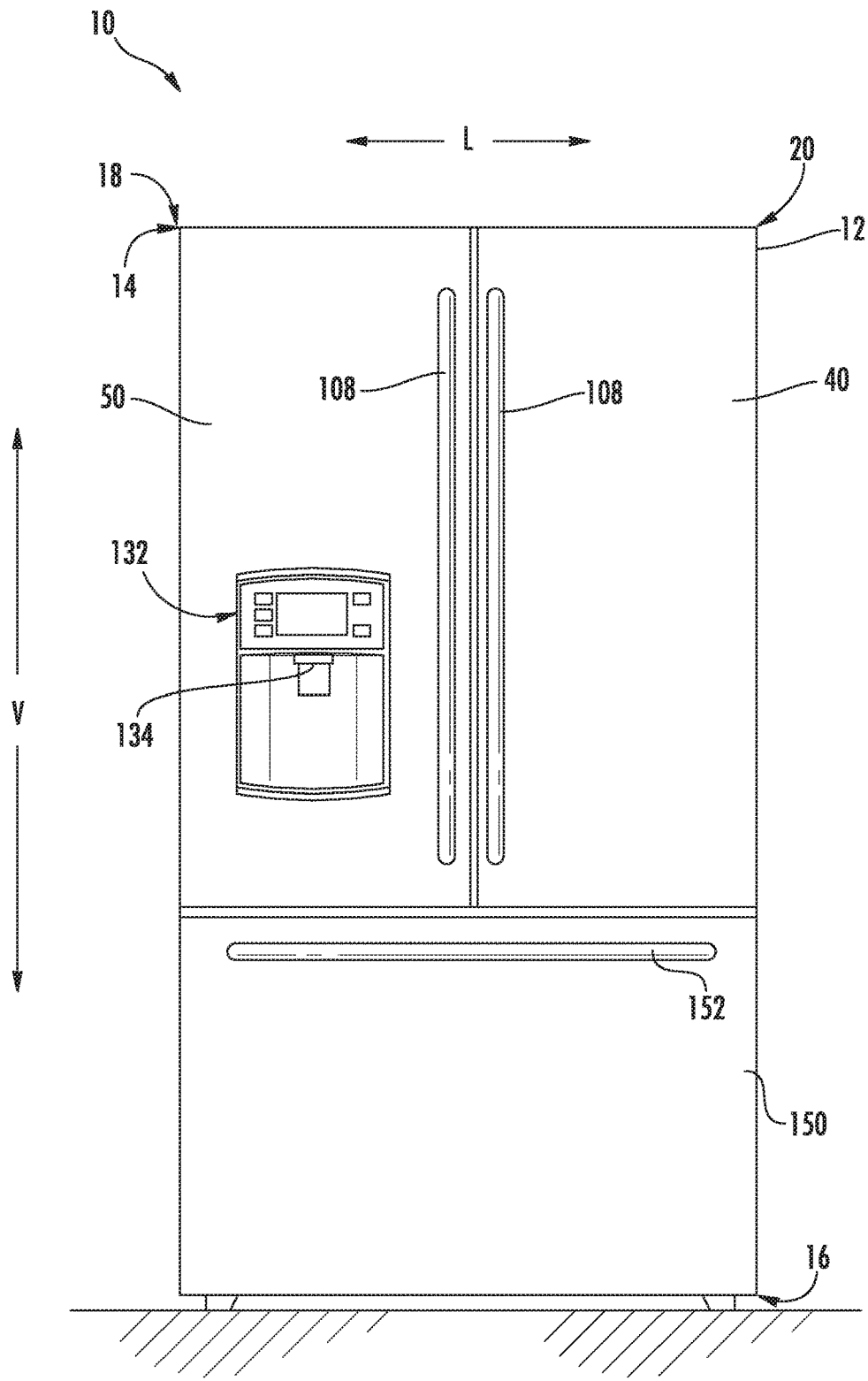
FIG. 1 provides a front elevation view of a refrigerator appliance according to embodiments of the present subject matter.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

As used herein, the terms "first," "second," and "third" may be used interchangeably to distinguish one component from another and are not intended to signify location or importance of the individual components. Terms such as "inner" and "outer" refer to relative directions with respect to the interior and exterior of the refrigerator appliance, and in particular the food storage chamber(s) defined therein. For example, "inner" or "inward" refers to the direction towards the interior of the refrigerator appliance. Terms such as "left," "right," "front," "back," "top," or "bottom" are used with reference to the perspective of a user accessing the refrigerator appliance. For example, a user stands in front of the refrigerator to open the doors and reaches into the food storage chamber(s) to access items therein.

Figure 2:
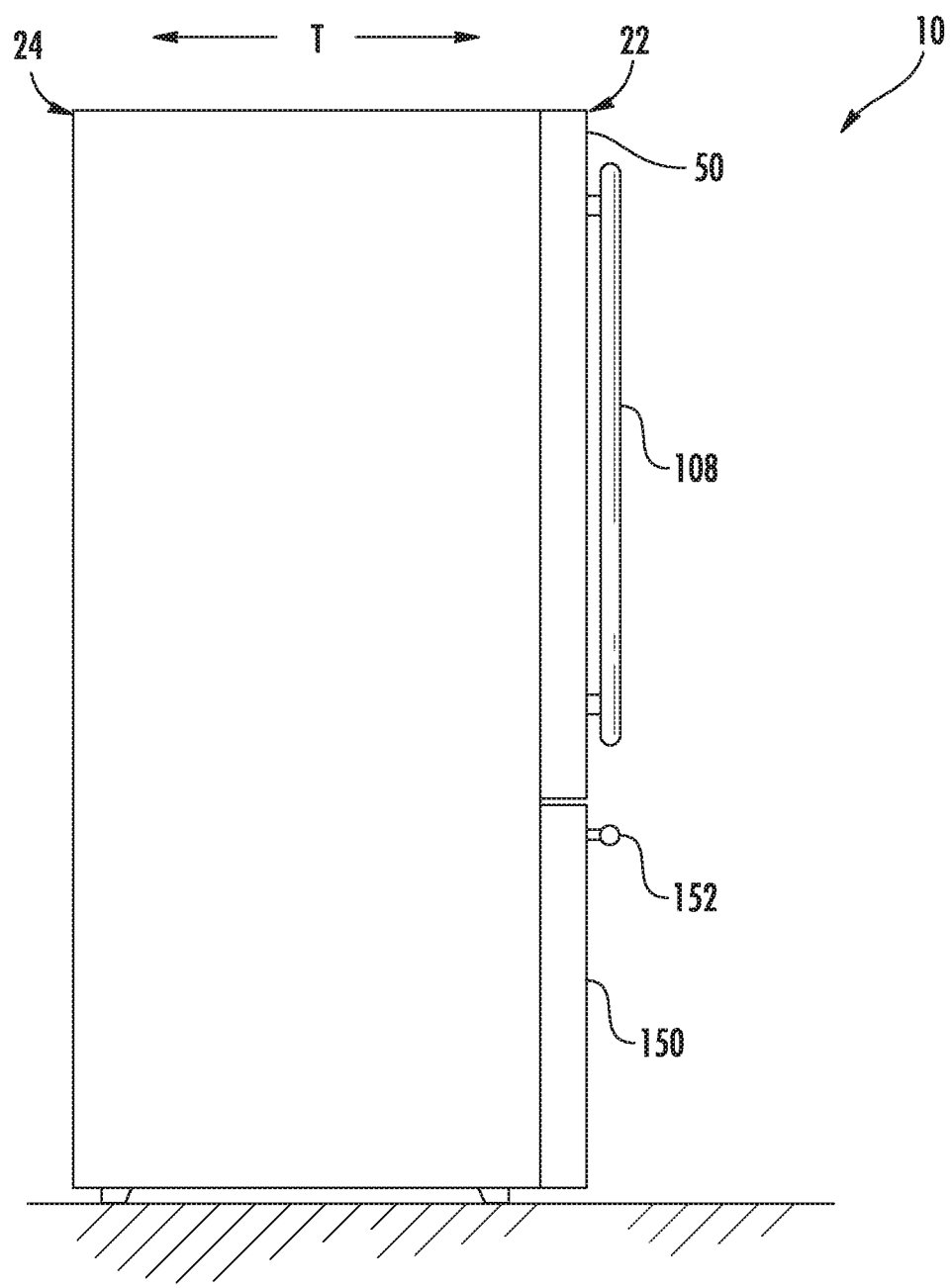
FIG. 2 provides a side view of the refrigerator appliance of FIG. 1.
Figure 3:
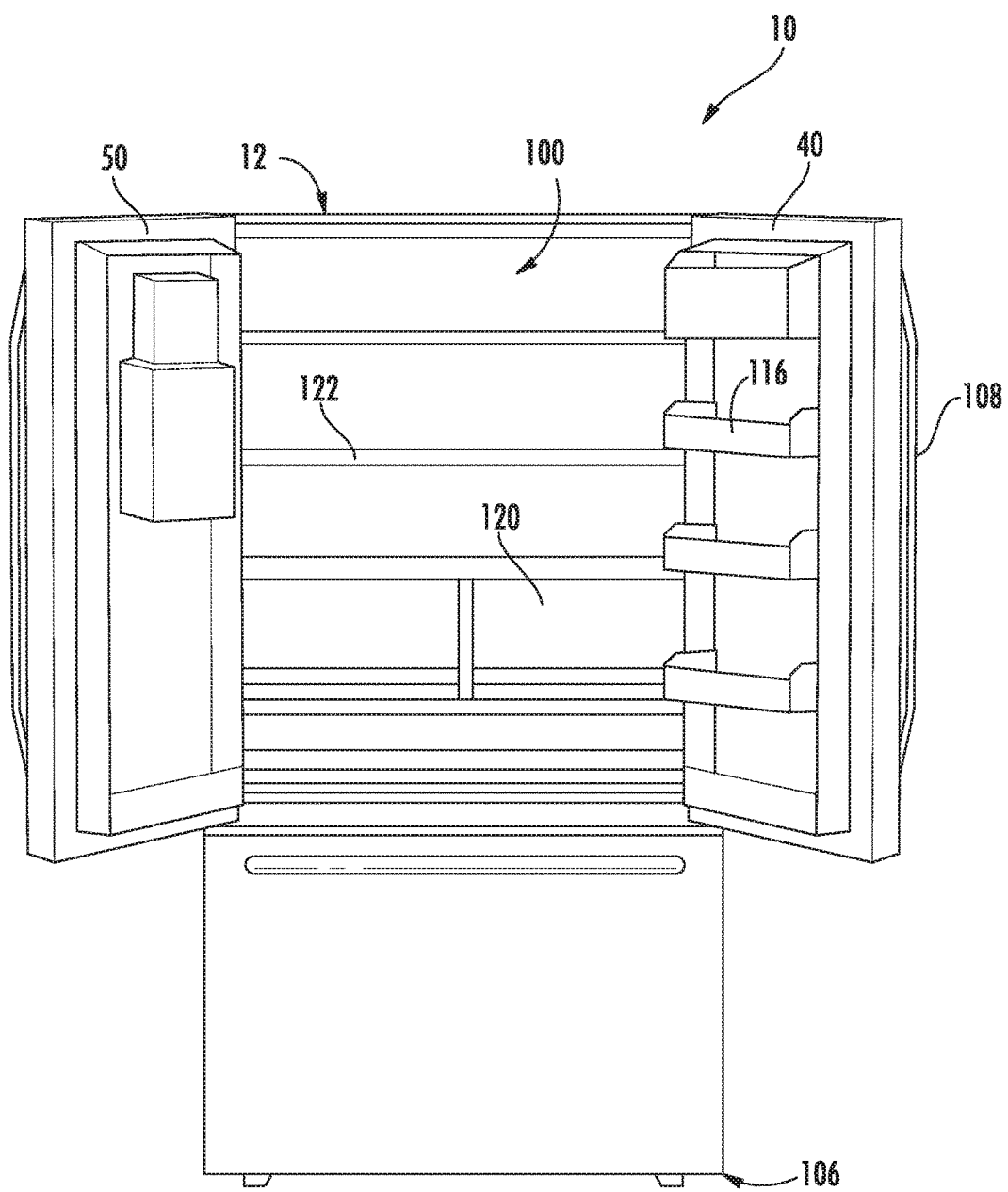
FIG. 3 provides a perspective view of the refrigerator appliance of FIG. 1.

Referring now to FIGS. 1-3, a refrigerator appliance 10 according to an embodiment of the present subject matter defines a vertical direction V, a lateral direction L, and a transverse direction T (see, e.g., FIG. 2), each mutually perpendicular to one another. As may be seen, the refrigerator appliance 10 includes a housing or cabinet 12 that extends between a top 14 and a bottom 16 along the vertical direction V, between a left side 18 and a right side 20 along the lateral direction L, and between a front side 22 and a rear side 24 along the transverse direction T (see, e.g., FIG. 2).

The cabinet 12 defines a food storage chamber 100 (FIG. 3) for receipt of food items for storage. In particular, the food storage chamber 100 is positioned at or adjacent the top 14 of the cabinet 12. It should be appreciated, however, that the food storage chamber 100 may be positioned at any suitable location within the refrigerator appliance 10. For example, in one embodiment, the food storage chamber 100 may extend from top 14 to bottom 16 along the vertical direction V.

The refrigerator appliance 10 may include refrigerator doors 40, 50 rotatably mounted to the cabinet, e.g., such that the refrigerator doors 40, 50 permit selective access to the food storage chamber 100. As shown, the refrigerator doors 40, 50 include a right refrigerator door 40 and a left refrigerator door 50. The right refrigerator door 40 may be rotatably mounted to the cabinet 12 at the right side 20 of the cabinet 12. The left refrigerator door 50 may be rotatably mounted to the left side 18 of the cabinet 12. As shown, a handle 108 may be positioned on each of the refrigerator doors 40, 50 to facilitate movement of the doors 40, 50 between a closed position (FIG. 1) and an open position (FIG. 3).

The refrigerator appliance 10 may also include a dispenser assembly 132 for dispensing liquid water and/or ice. The dispenser assembly 132 includes a dispenser 134 positioned on or mounted to an exterior portion of the refrigerator appliance 10, e.g., on the left refrigerator door 50. In addition, the refrigerator appliance 10 may include a freezer drawer 150 arranged below the refrigerator doors 40, 50 for selectively accessing items a frozen food storage chamber (not shown). The freezer drawer 150 includes a handle 152, and is slidably mounted to the cabinet 12. Accordingly, the freezer drawer 150 may be moved in and out of the frozen food storage chamber (not shown) along the transverse direction T.

As shown in FIG. 3, various storage components are mounted within the food storage chamber 100 to facilitate storage of food items therein as will be understood by those skilled in the art. In particular, the storage components include bins 116, drawers 120, and shelves 122 that are mounted within the fresh food chamber 100. The bins 116, drawers 120, and shelves 122 are configured for receipt of food items (e.g., beverages and/or solid food items) and may assist with organizing such food items.

Referring now to FIGS. 4-6, the refrigerator appliance 10 may be configured as a door-in-door refrigerator. In particular, the right refrigerator door 40 may be replaced with a nested door assembly comprising an outer door 102 and an inner door 105. In an alternative embodiment, the left refrigerator door 50 may be replaced with the nested door assembly. In another alternative embodiment, both refrigerator doors 40, 50 may be replaced with the nested door assembly.

The inner door 105 may include an outer surface 128 and an opposing inner surface 130, and the inner door 105 may be rotatably hinged to the cabinet 12, e.g., such that the inner door 105 is movable between a closed position and an open position (FIG. 4) to permit selective access to the food storage chamber 100 of the cabinet 12. In particular, the inner door 105 may be mounted to the cabinet 12 at the right side 20 of the cabinet 12. The inner door 105 may define an opening extending through the outer and inner surfaces 128, 130 and into the food storage chamber 100. In addition, the inner door 105 may include a frame 106. As shown, the frame 106 may be positioned on the interior surface 130 of the inner door 105, and the frame 106 may extend around a perimeter of the opening defined by the inner door 105. In addition, the frame 106 may extend into the fresh food storage chamber 100 when the inner door 105 is in the closed position.

The outer door 102 of the nested door assembly may include an outer surface 124 and an opposing inner surface 126. As shown, the outer door 102 may be rotatably hinged to the inner door 105, and the outer door 102 may be movable between a closed position (FIG. 1) and an open position (FIG. 4). In one embodiment, the outer door 102 is movable to permit selective access to a portion of the food storage chamber 100 through the opening defined by the inner door 105. In one embodiment, a portion of the outer door 102 can be received within the frame 106 of the inner door 105 to define a second food storage chamber 101. In particular, the second food storage chamber 101 may be contiguous with the food storage chamber 100. It should be appreciated, however, that the second food storage chamber 101 may be isolated from the food storage chamber 100. For example, the second storage chamber 101 may be a cavity defined in the outer surface 128 of the inner door 105. In particular, the cavity may not extend through the inner surface 130 of the inner door 105 and, as a result, may be isolated from the food storage chamber 100.

It should be appreciated that the outer and inner doors 102, 105 move in the same direction. For example, the outer and inner doors 102, 105 may each move away from the food storage chamber 100 when moving towards the open position. In contrast, the outer and inner doors 102, 105 may each move towards the food storage chamber 100 when moving towards the closed position.

The refrigerator appliance 10 may also include a gasket 140 positioned on the inner surface 126 of the outer door 102. As the outer door 102 moves towards the closed position, the outer door 102 may compress the gasket 140 against the outer surface 128 of the inner door 105. More specifically, the gasket 140 may seal against the outer surface 128 of the inner door to enclose the food storage chamber 100 or, alternatively, the second food storage chamber 101. In an alternative embodiment, the gasket 140 may be positioned on the outer surface 128 of the inner door 105 and, as the outer door 102 moves towards the closed position, the inner door 105 may compress the gasket 140 against the inner surface 126 of the outer door 102. More specifically, the gasket 140 may seal against the inner surface 126 of the outer door 102. It should be appreciated that the gasket 140 may be comprised of any suitable material. For example, in one embodiment, the gasket 140 may be comprised of rubber.

The refrigerator appliance 10 may also include a locking assembly to lock the outer and inner doors 102, 105 together. As shown in FIGS. 4 and 5, the locking assembly may include a catch 110 provided on the inner door 105 and a latch 112 provided on the outer door 102. In addition, a handle 108 positioned on the outer door 102 may include a button or trigger 113 operably coupled with the latch 112. In addition, a latch housing 114 may be mounted to the handle 108, and both the latch 112 and the trigger 113 may, at least in part, be positioned within the latch housing 114.

In operation, a user may grasp the handle 108 of the outer door 102, pull the trigger 113 to release the latch 112 from the catch 110 and thereby unlock the outer door 102 from the inner door 105. When the outer door 102 is unlocked from the inner door 105, the outer door 102 may rotate independent of the inner door 105. As such, a user may access the bins 116 without opening the inner door 105. Alternatively, operating the handle 108 without pulling the trigger 113 permits opening the outer 102 and the inner door 105 together for full access to the food storage chamber 100.

Figure 7:
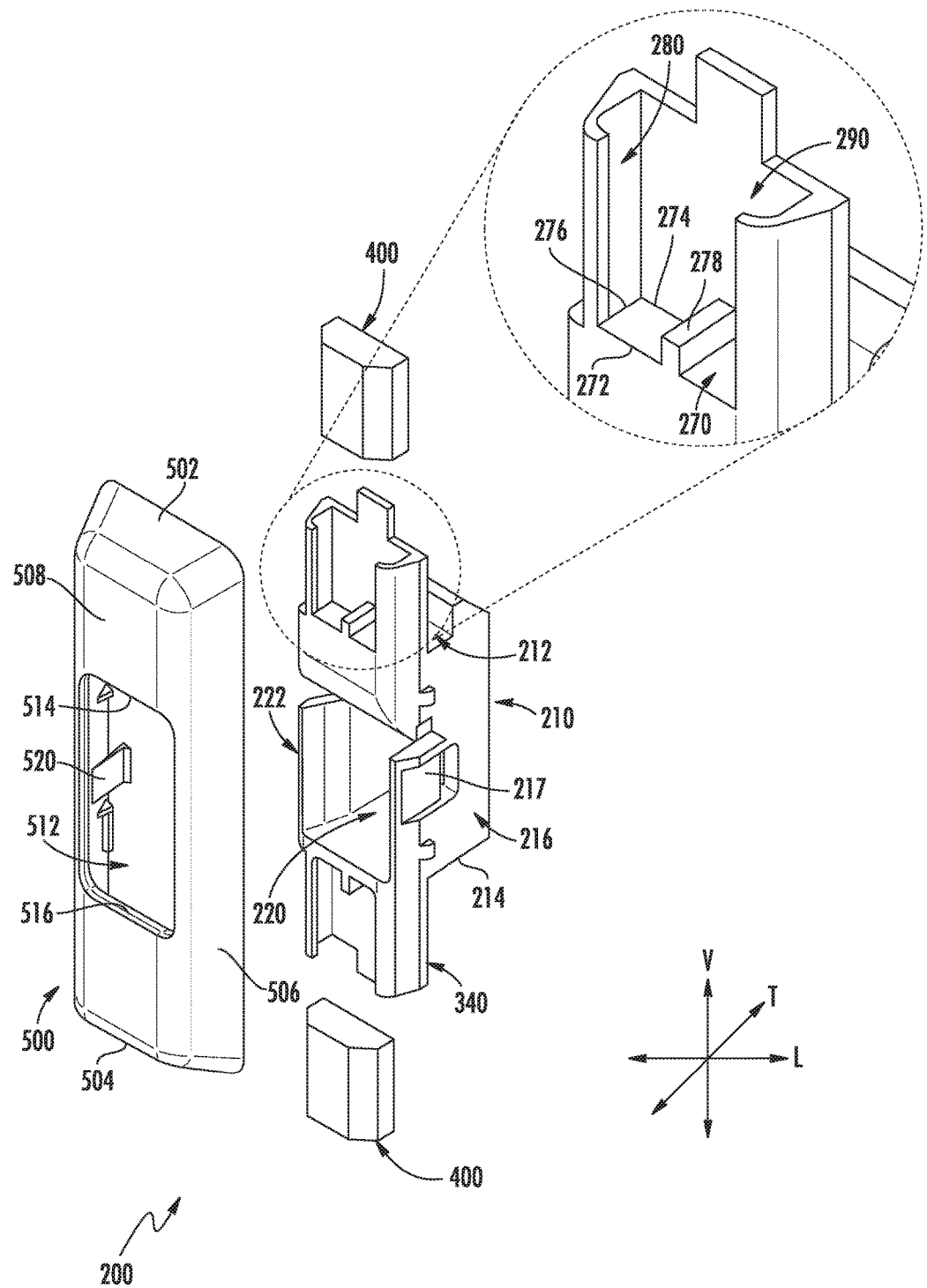
FIG. 7 provides an assembly view of a catch in accordance with embodiments of the present subject matter.
Figure 8:
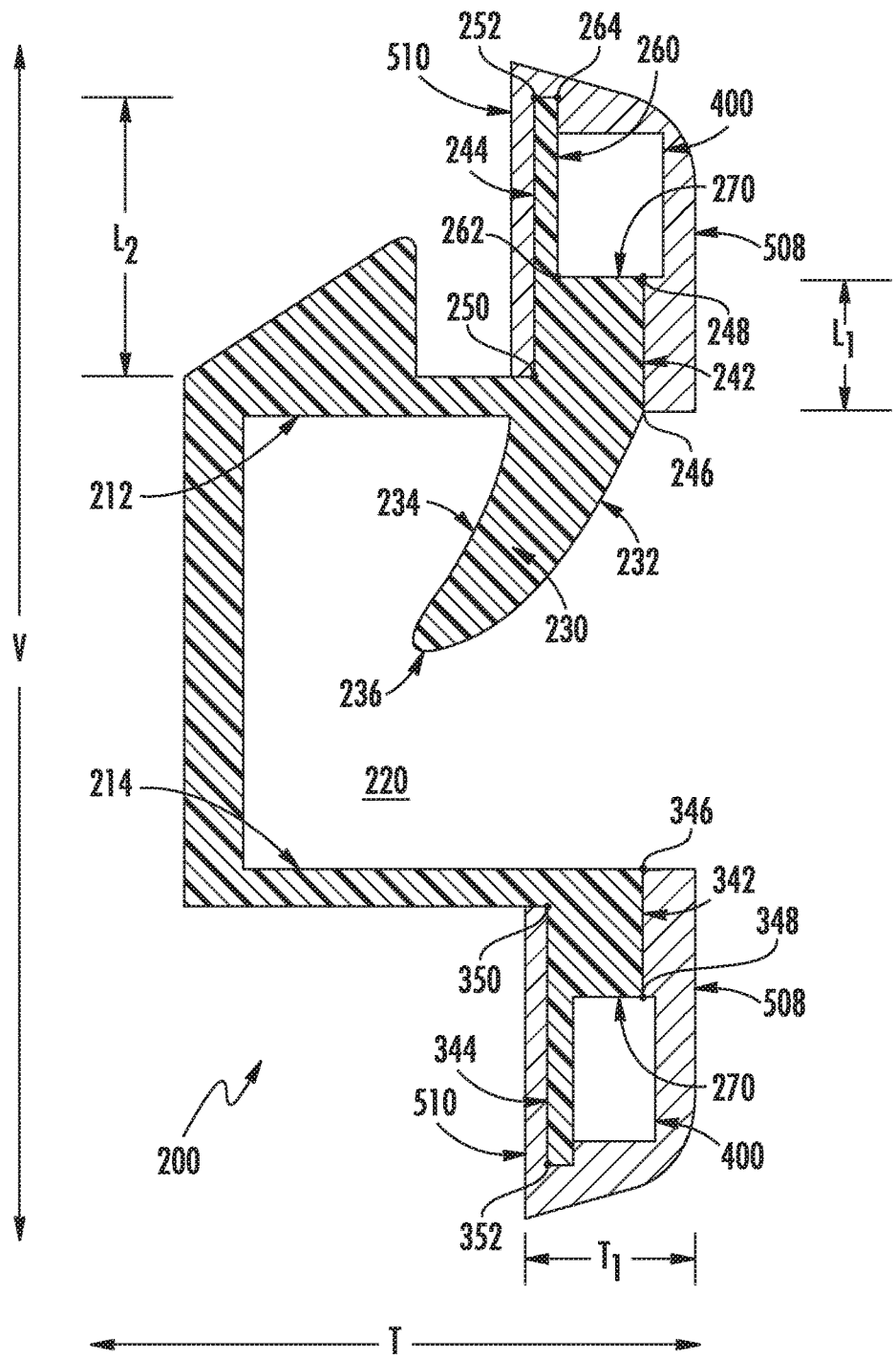
FIG. 8 provides a cross-sectional view of the catch of FIG. 7.

FIGS. 7 and 8 depict an embodiment of a catch 200 in accordance with the present subject matter. The catch 200 includes a body 210 having a top wall 212, a bottom wall 214, a pair of side walls 216 (only one shown), and a rear wall 218. The top and bottom walls 212, 214 are spaced apart from one another along the vertical direction V. The pair of side walls 216 are spaced apart from each another along the lateral direction L. Each sidewall of the pair of side walls 216 defines a recess 217 and, in addition, extends between the top and bottom walls 212, 214 along the vertical direction V. The rear wall 218 extends between the pair of side walls 216 along the lateral direction L, and between the top and bottom walls 212, 214 along the vertical direction V.

The body 210 defines a cavity 220 extending between the top and bottom wall 212, 214 along the vertical direction V, between the pair of side walls 216 along the lateral direction L, and between the rear wall 218 and a front surface 222 of the body 210 along the transverse direction T. In the embodiment depicted, the cavity 220 has a rectangular shape. It should be appreciated, however, that the cavity 220 may have any suitable shape. For example, in an alternative embodiment, the cavity 220 may have a square shape.

The body 210 includes a locking member 230. As shown, the locking member 230 includes a front surface 232 and a rear surface 234 spaced apart from the front surface 232 along the transverse direction T. The front and rear surfaces 232, 234 each extend from the top wall 212 along the vertical direction V. More specifically, the front and rear surfaces 232, 234 each extend into the cavity 220. In addition, the first and second surfaces 232, 234 may converge within the cavity 220 to form a tip region 236 that is distal from the top wall 212 of the body 210. In the illustrated embodiment, the cross-sectional area of the locking member 230 resembles a hook. It should be appreciated, however, that the locking member 230 may define any suitable cross-sectional area.

The body 210 also includes a first support 240 and a second support 340. As shown, the first and second supports 240, 340 are positioned at the front surface 222 of the body 210. In addition, the first and second supports 240, 340 are spaced apart from one another along the vertical direction V. More specifically, the cavity 220 is positioned between the first and second supports 240, 340 along the vertical direction V. The first and second supports 240, 340 each extend along the vertical direction V. In particular, the first and second supports 240, 340 extend away from the cavity 220 in opposing directions.

The first support 240 includes a front surface 242 and a rear surface 244 spaced apart from the front surface 242 along the transverse direction T. The front surface 242 extends between a first end 246 and a second end 248 along the vertical direction V. In some embodiments, the first end 246 is contiguous with the front surface 232 of the locking member 230. However, in alternative embodiments, a transition surface (not shown) may be provided between the first support 240 and the front surface 232 of the locking member 230 along the vertical direction V.

The rear surface 244 of the first support 240 extends between a first end 250 and a second end 252 along the vertical direction V. As shown, the first end 250 of the rear surface 244 is spaced apart from the first end 246 of the front surface 242 along the vertical direction V. In addition, the second end 252 of the rear surface 244 is spaced apart from the second end 248 of the front surface 242 along the vertical direction V.

The front and rear surfaces 242, 244 of the first support 240 each define a length along the vertical direction V. In particular, the front surface 242 defines a first length $L_1$ extending between the first and second ends 246, 248 along the vertical direction V. The rear surface 244 defines a second length $L_2$ extending between the first and second ends 250, 252 along the vertical direction V. As shown, the first length $L_1$ is different than the second length $L_2$. More specifically, the first length $L_1$ is less than the second length $L_2$.

The first support 240 may also include an intermediate surface 260 positioned between the front and rear surfaces 242, 244 along the transverse direction T. The intermediate surface 260 extends between a first end 262 and a second end 264 along the vertical direction V. In particular, the first end 262 of the intermediate surface 260 is aligned with the second end 248 of the front surface 242 along the transverse direction T, and the second end 264 of the intermediate surface 260 is aligned with the second end 252 of the rear surface 244 along the transverse direction T.

The first support 240 may also include a support surface 270 extending along a plane that is perpendicular to the vertical direction V. As shown, the support surface 270 extends between the front surface 242 and the intermediate surface 260 along the transverse direction T. In particular, the support surface 270 extends from the second end 248 of the front surface 242 to the first end 262 of the intermediate surface 260 along the transverse direction T. Accordingly, the support surface 270 is substantially perpendicular to both the front and intermediate surfaces 242, 260. However, in alternative embodiments, the second end 248 of the front surface 242 and the first end 262 of the intermediate surface 260 may not be aligned along the vertical direction V. As such, in these alternative embodiments, the support surface 260 may be sloped.

As shown in FIG. 7, the support surface 270 includes a front edge 272, a rear edge 274, and opposing edges 276 (only one shown). The front and rear edges 272, 274 are spaced apart from one another along the transverse direction T. In addition, the opposing edges 276 are spaced apart from one another along the lateral direction L. The support surface 270 also includes a projection 278 positioned between the opposing edges 276 along the lateral direction L. The projection 278 extends from the support surface 270 along the vertical direction V. In particular, the projection 278 extends away from the cavity 220 along the vertical direction V. The intermediate surface 260 extends from the rear edge 274 of the support surface 270 along the vertical direction V. In particular, the first end 262 of the intermediate surface 260 is positioned at the rear edge 274 of the support surface 270, and the intermediate surface 260 extends from the first end 262 to the second end 264 along the vertical direction V.

The first support 240 also includes a pair of surfaces 280 spaced apart from one another along the lateral direction L. Each surface of the pair of surfaces 280 extends from the support surface 270 along the vertical direction V. In particular, each surface of the pair of surfaces 280 extends from one of the pair of opposing edges 276. Additionally, each surface of the pair of surfaces 280 extends away from the cavity 220 along the vertical direction V and between the front and rear edges 272, 274 along the transverse direction T. Accordingly, the first support 240 defines a cavity 290 extending between the pair of surfaces 280 along the lateral direction L, and between the intermediate surface 260 and the front edge 272 of the support surface 270 along the transverse direction T.

The second support 340 is configured in substantially the same manner as the first support 240, and accordingly, the same or similar reference numbers may be used for the same or similar components. As shown, the second support includes a front surface 342 and a rear surface 344 spaced apart from one another along the transverse direction T. It should be appreciated that the front surface 342 of the second support 340 is contiguous with the front surface 222 of the body 210. The front surface 344 extends between a first end 346 and a second end 348 along the vertical direction V, and the rear surface 344 extends between a first end 350 and a second end 352 along the vertical direction V. As shown, the first end 350 of the rear surface 344 is spaced apart from the first end 346 of the front surface 342 along the vertical direction V. In addition, the second end 352 of the rear surface 344 is spaced apart from the second end 348 of the front surface 342 along the vertical direction V. It should be appreciated that the remaining structure of the second support 340 is substantially the same as that of the first support 240. Thus, the remaining structure of the second support 340 will not be discussed in further detail.

As will be discussed below in more detail, a magnet 400 may be positioned on the supporting surface 270 of the first and second supports 240, 340. Alternatively, or in addition to, the magnet 400 may be positioned within the cavity 290 defined by the first and second supports 240 and 340, respectively. It should be appreciated that the magnet may be a permanent magnet comprised of any suitable ferromagnetic material. For example, the magnet may be comprised of Iron (Fe), Nickel (Ni), Cobalt (Co), or steel.

The catch 200 also includes a cover 500. As shown, the cover 500 includes a top wall 502, a bottom wall 504, and a pair of side walls 506 (only one shown). The top and bottom walls 502, 504 are spaced apart from one another along the vertical direction V, and the pair side walls 506 are spaced apart from one another along the lateral direction L. The cover 500 also includes a front surface 508 extending between the top and bottom walls 502, 504 along the vertical direction V, and between the pair of side walls 506 along the lateral direction L. The cover 500 also includes a rear surface 510 spaced apart from the front surface 508 along the transverse direction T. As shown, a thickness $T_1$ of the cover 500 is defined between the front and rear surfaces 508, 510 along the transverse direction T.

As shown, the front surface 508 defines an opening 512. In some embodiments, a top portion 514 of the opening 512 may be aligned with the first support 240 along the vertical direction V. In particular, the top portion 514 may be aligned with the front edge 272 of the support surface 270 along the vertical direction V. In addition, a bottom portion 516 of the opening 512 may be aligned with the bottom wall 214 of the body 210 along the vertical direction V.

When assembled, the cover 500 may be attached to the body 210 via a pair of tabs 520 (only one shown). Each tab 520 may be formed on one of the pair of side wall 506, and may be received within the recess 217 defined in each sidewall of the pair of sidewall 216 of the body 210.

Furthermore, when attached to the body 210, the cover 500 may enclose the magnet 400 positioned on the support surface 270 of the first and second supports 240 and 340, respectively. It should be appreciated that the cover 500 may be made out of any suitable material. For example, in some embodiments, the cover may be comprised of plastic, such as polyurethane. In alternative embodiments, the cover 500 may be comprised of a ferromagnetic material, such as steel.

Figure 9:
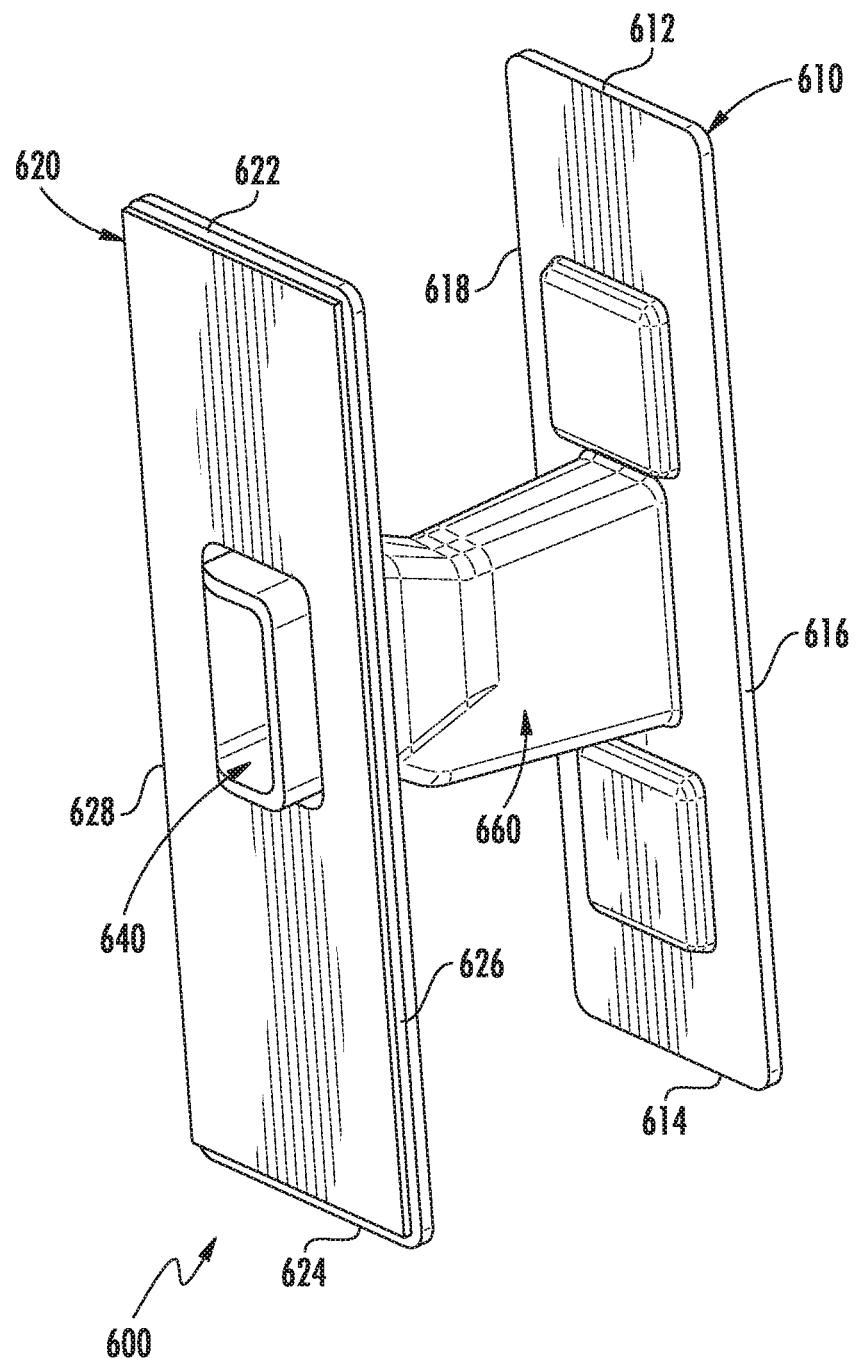
FIG. 9 provides a perspective view of a latch housing in accordance with the present subject matter.
Figure 10:
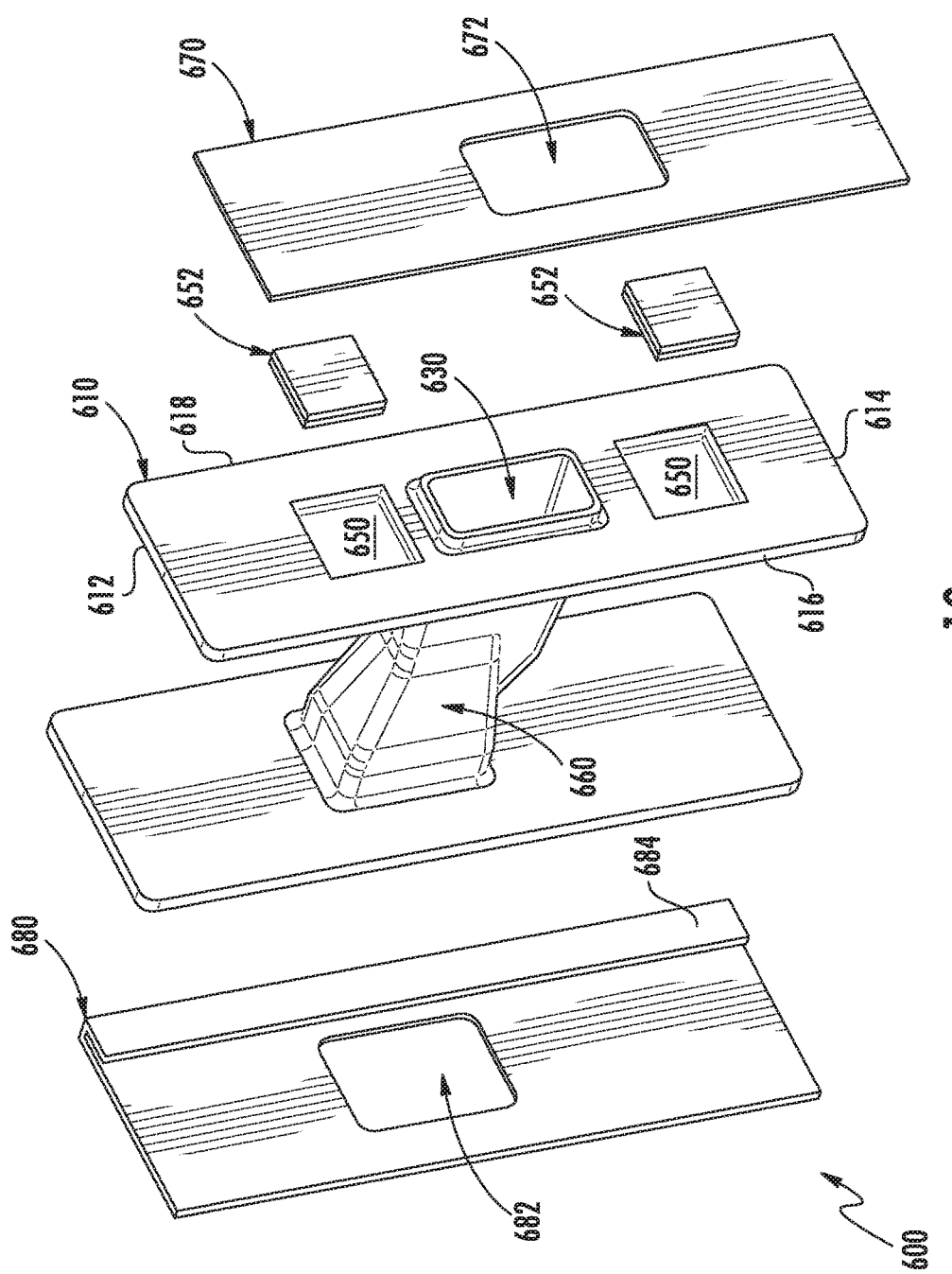
FIG. 10 provides an assembly view of the latch housing of FIG. 8.
Figure 11:
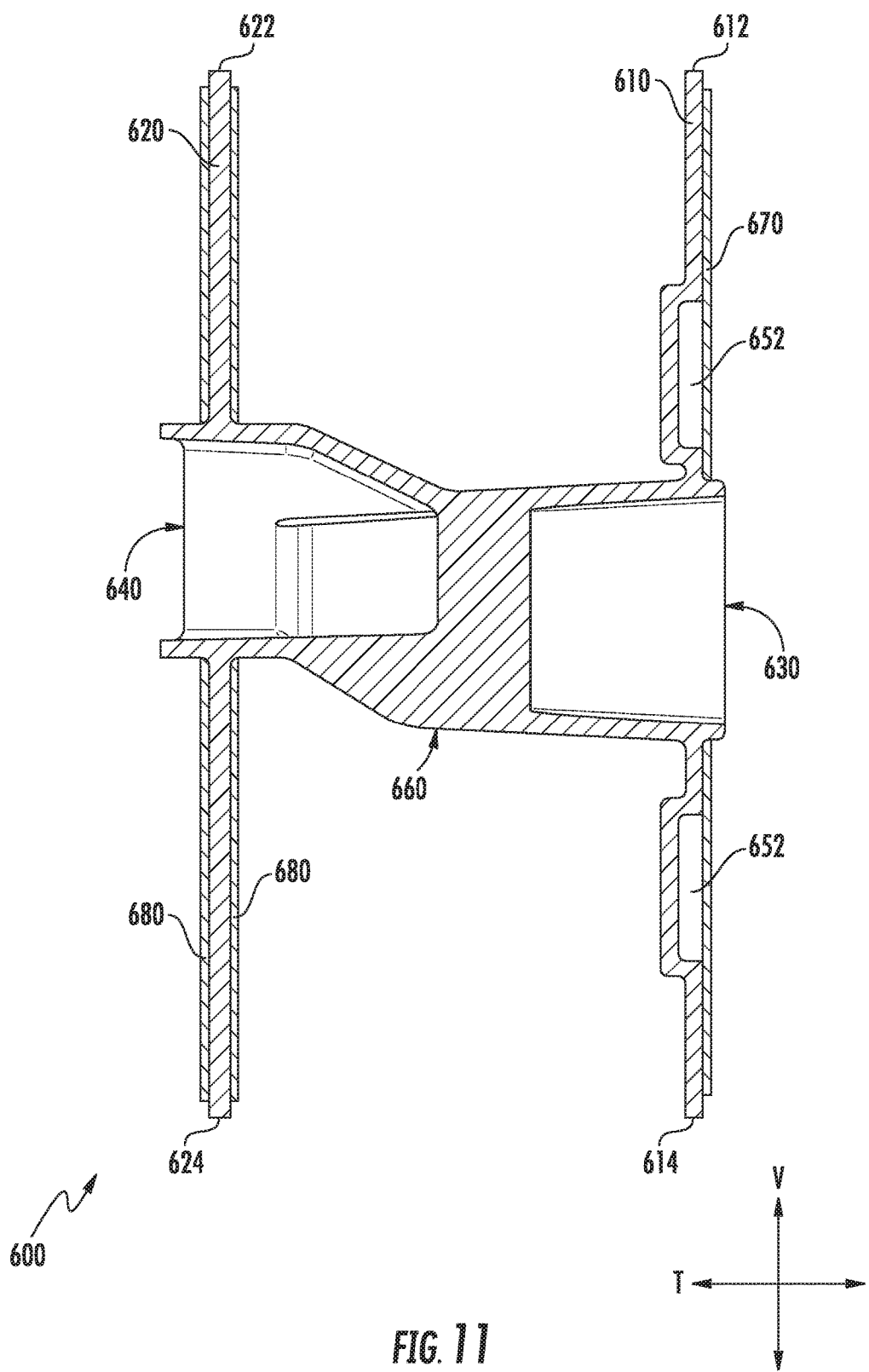
FIG. 11 provides a cross-sectional view of the latch housing of FIG. 8.

FIGS. 9-11 depict an embodiment of a latch housing 600 for the latch 112 of the refrigerator appliance 10. The latch housing 600 includes a first panel 610 and a second panel 620. As shown, the first and second panels 610, 620 are spaced apart from one another along the transverse direction T. In particular, the first panel 610 extends between a top 612 and a bottom 614 along the vertical direction V, and between opposing sides 616, 618 along the lateral direction L. The second panel 620 extends between a top 622 and a bottom 624 along the vertical direction V, and between opposing sides 626, 628 along the lateral direction L.

The first panel 610 defines an opening 630 positioned between the top 612 and bottom 614 along the vertical direction V, and the second panel 620 defines an opening 640 positioned between the top 622 and bottom 624 along the vertical direction V. As shown, a bottom portion 622 of the opening 630 defined by the first panel 610 is spaced apart from a bottom portion 642 of the opening 640 defined by the second panel 620. More specifically, the bottom portion 622 of the opening 630 is spaced apart from the bottom portion 642 of the opening 640 along the vertical direction V.

The first panel 610 also defines a pair of cavities 650 spaced apart from one another along the vertical direction V. More specifically, the opening 630 defined by the first panel 610 is positioned between the pair of cavities 650 along the vertical direction V. As will be discussed below in more detail, the pair of cavities 650 may be aligned with the cavity 290 defined by the first and second supports 240, 340 along the vertical direction V. Additionally, a magnetic object 652 may be positioned within each cavity of the pair of cavities 650. In one embodiment, the magnetic object 652 is a magnet such as, without limitation, a permanent magnet. In an alternative embodiment, the magnetic object 652 may be comprised of ferritic steel.

The latch housing 600 defines a conduit 660 extending from the first panel 610 to the second panel 620 along the transverse direction T. More specifically, the conduit 660 extends from the opening 630 defined by the first panel 610 to the opening 640 defined by the second panel 620 along the transverse direction T. Accordingly, the latch 112 may extend through the conduit 660 along the transverse direction T.

The latch housing 600 also includes a cover 670 for the first panel 610. As shown, the cover 670 defines an opening 672, and the cover 670 may be positioned on the first panel 610 such that the opening 672 defined by the cover 670 is aligned with the opening 630 defined by the first panel 610 along the vertical direction V. The cover 670 may also enclose the pair of cavities 650 defined by the first panel 620. In the embodiment depicted, the cover 670 is comprised of a foam material. It should be appreciated, however, that the cover 670 may be comprised of any suitable material.

The latch housing 600 also includes a cover 680 for the second panel 620. As shown, the cover 680 defines an opening 682, and the cover 680 may be positioned on the second panel 620 such that the opening 682 defined by the cover 680 is aligned with the opening 640 defined by the second panel 620 along the vertical direction V. The cover 680 may also comprise a clip 684. As follows, the cover 680 may be attached to the second panel 620 via the clip 684. In the illustrated embodiment, the cover 680 is comprised of a foam material. It should be appreciated, however, that the cover 680 may be comprised of any suitable material.

Figure 12:
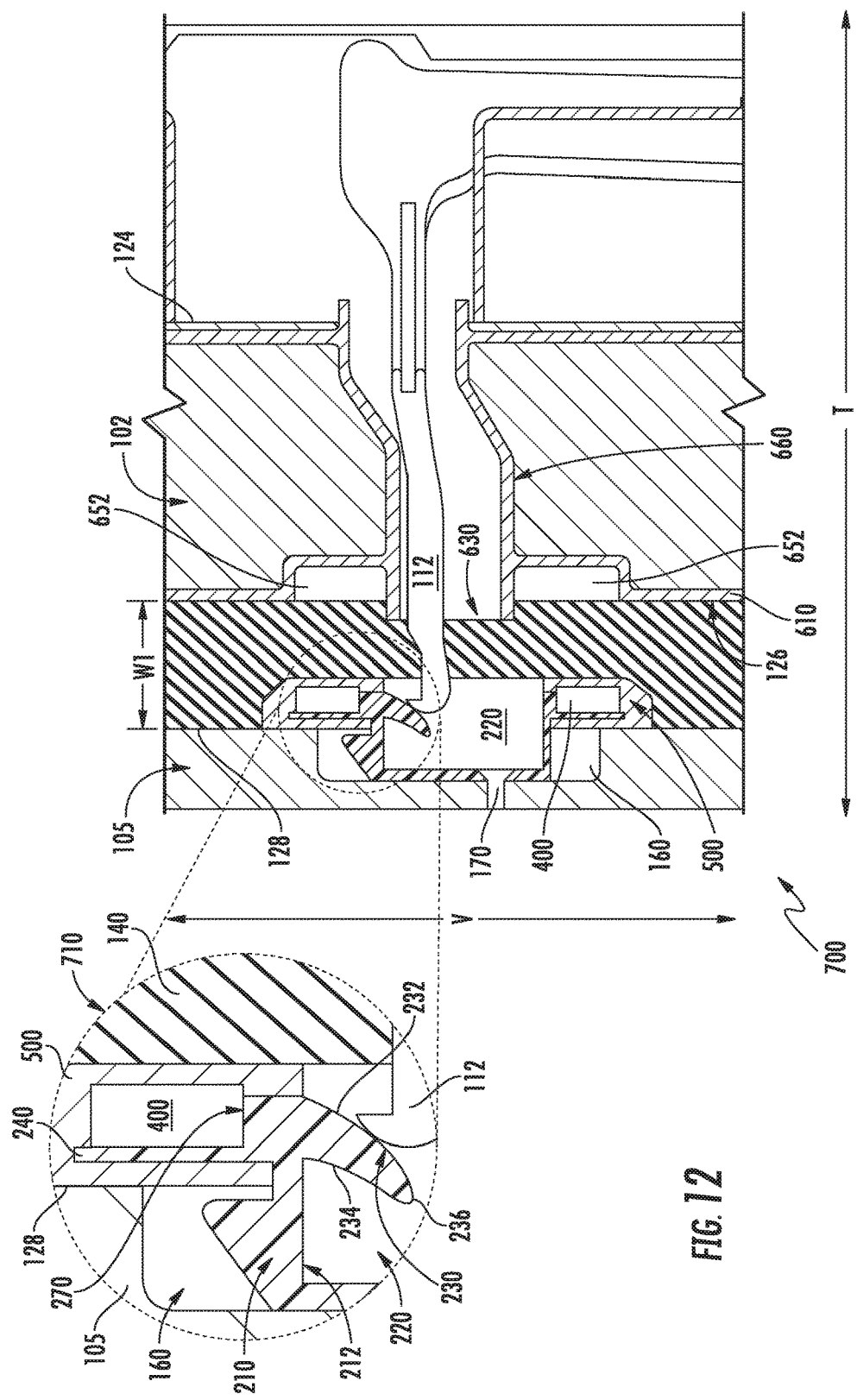
FIG. 12 provides a cross-sectional view of a locking assembly in which a latch of the locking assembly is shown in a first position.
Figure 13:
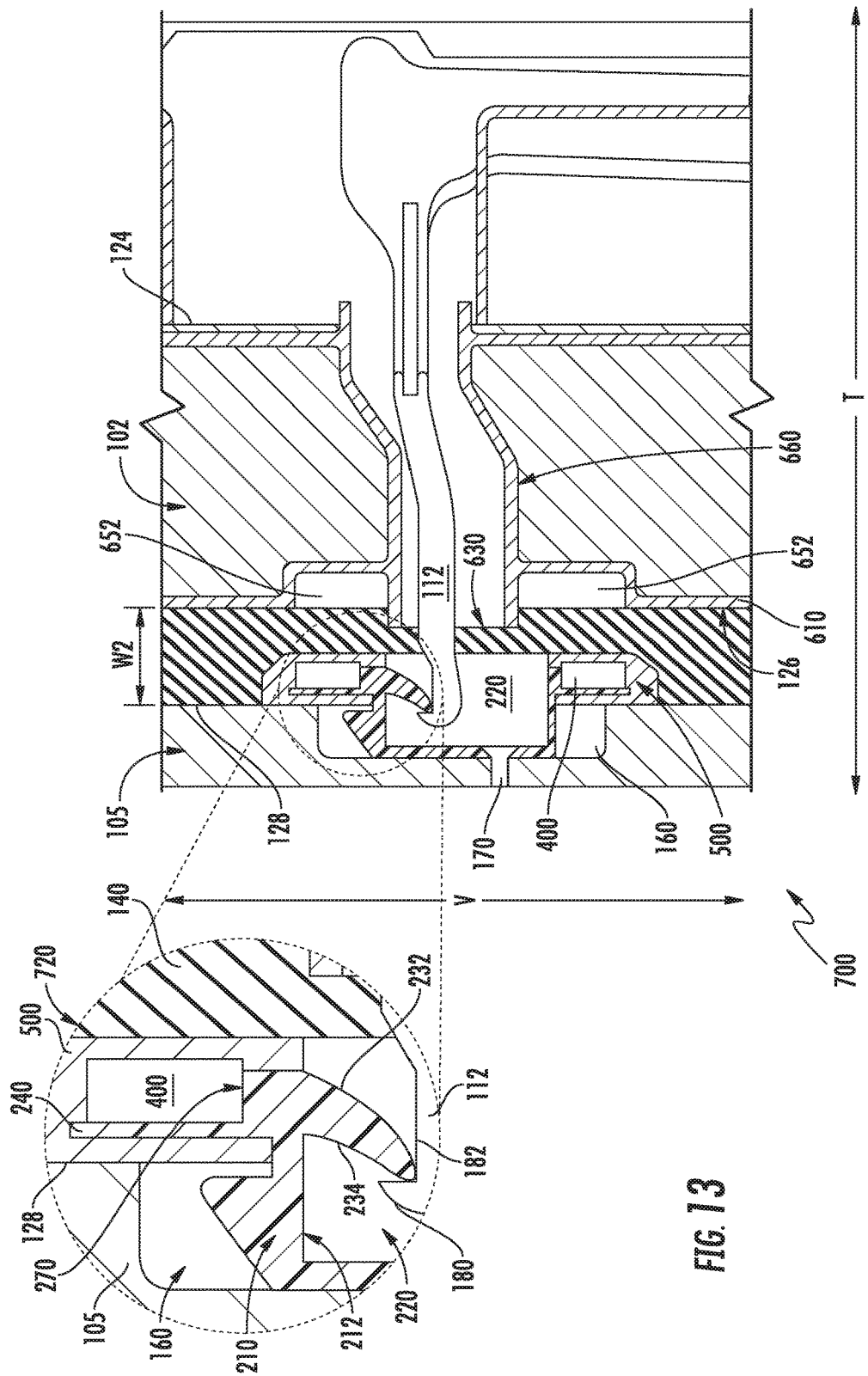
FIG. 13 provides another cross-sectional view of the locking assembly of FIG. 12 in which the latch is shown in a second position.
Figure 14:
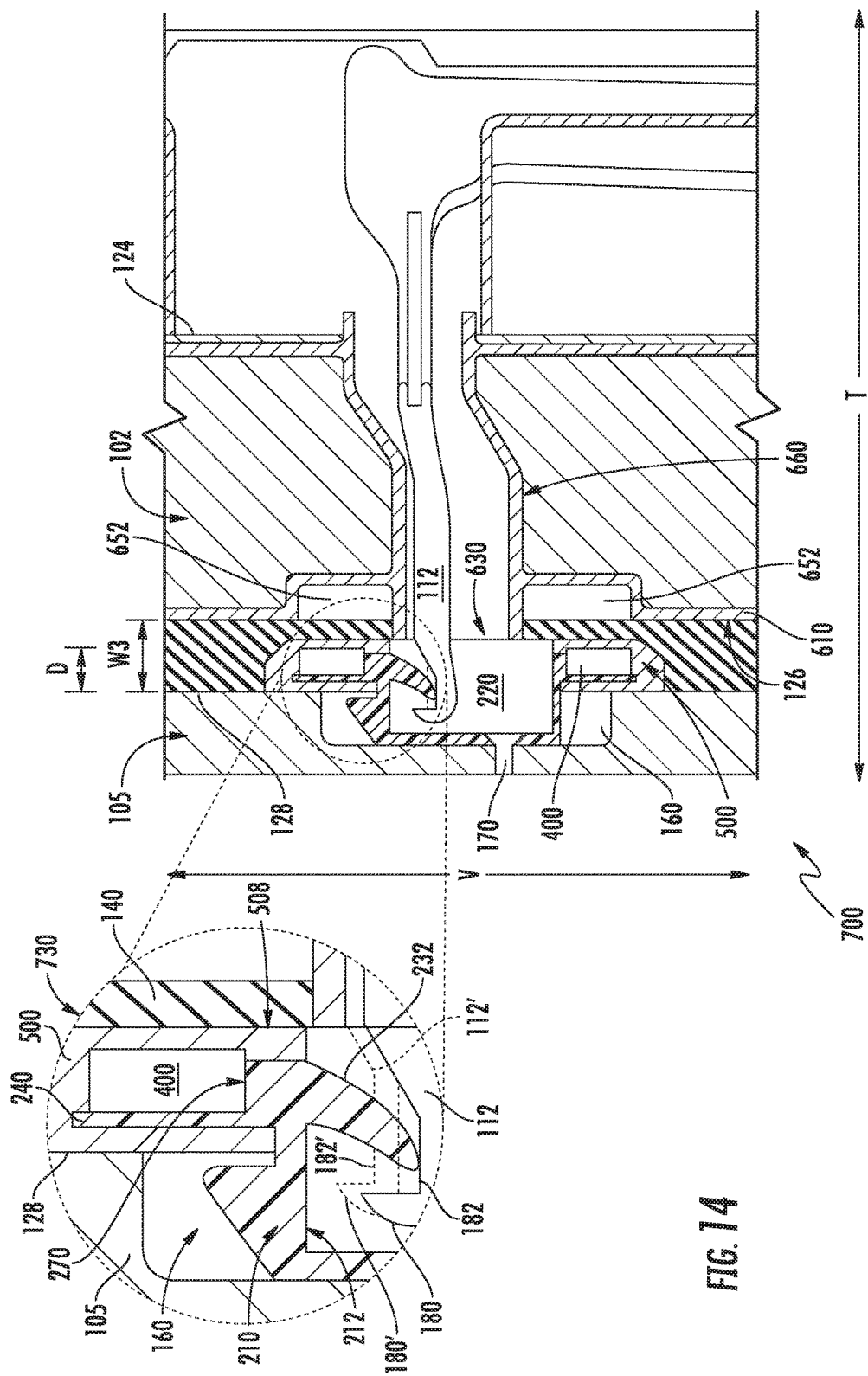
FIG. 14 provides yet another cross-sectional view of the locking assembly of FIG. 12 in which the latch is shown in a third position.

FIGS. 12-14 depict a lock assembly 700 for a door-in-door refrigerator, such as the refrigerator appliance 10 discussed above and depicted in FIGS. 4-6. The lock assembly 700 includes the latch 112, the catch 200, and the latch housing 600 discussed above. As shown, the catch 200 is mounted to the inner door 105, and the latch housing 600 is mounted to the outer door 102. In particular, the outer surface 128 of the inner door 105 defines a cavity 160, and a portion of the catch 200, specifically the body 210, is positioned within the cavity 160. As shown, the body 210 is mounted to the inner door 105 via a mechanical fastener 170 extending through an aperture (not shown) defined by the rear wall 218 of the body 210 and a corresponding aperture (not shown) defined by the inner door 105. It should be appreciated that the corresponding aperture defined by the inner door 105 is positioned within the cavity 160 defined by the inner door 105.

The first and second supports 240, 340 of the body 210 are positioned between the outer surface 128 of the inner door 105 and the inner surface 126 of the outer door 102 along the transverse direction T. In particular, the rear surfaces 244, 344 of the first and second supports 240, 340 are positioned against the cover 500 which, as shown, is positioned against the outer surface 128 of the inner door 105. As such, the support surface 270 of the first and second supports 240, 340 is positioned between the outer surface 128 of the inner door 105 and the inner surface 126 of the outer door 102 along the transverse direction T. Thus, the magnet 400 positioned on the support surface 270 of the first and second supports 240, 340 is positioned between the outer surface 128 of the inner door 105 and the inner surface 126 of the outer door 102 along the transverse direction T.

FIGS. 12-14 depict movement of the outer door 102 towards the inner door 105 along the transverse direction T. FIG. 12 depicts the outer door 102 in a first position 710 in which the latch 112, specifically a front portion 180 thereof, contacts the front surface 232 of the locking member 230. It should be appreciated, however, that the outer and inner doors 102, 105 are not locked together when the latch 112 is in the first position 710. In addition, when the outer door 102 is in the first position 710, the gasket 140 positioned on the inner surface 126 of the outer door 102 defines a first width $W_1$ along the transverse direction T. However, as the outer door 102 moves closer to the inner door 105 along the transverse direction T, it should be appreciated that the outer door 102 compresses the gasket 140 against the inner door 105. Thus, as depicted in FIGS. 13-14 and discussed below in more detail, the width of the gasket 140 decreases as the outer door 102 moves closer to the inner door 105 along the transverse direction T.

Referring now to FIG. 13, as the outer door 102 moves closer to the inner door 105 along the transverse direction T, the outer door 102 moves from the first position 710 to a second position 720 in which the latch 112 engages the locking member 230 to lock the outer and inner doors 102, 105 together. More specifically, when the outer and inner doors 102, 105 are locked together, the front portion 180 of the latch 112 is spaced apart from the front surface 232 of the locking member 230 along the transverse direction T, and a contact surface 182 of the latch 112 touches the tip region 236 of locking member 230. In addition, as the outer door 102 moves from the first position 710 to the second position 720, the outer door 102 compresses the gasket 140 against the inner door 105 such that the width of the gasket 140 decreases from the first width $W_1$ (FIG. 12) to a smaller second width $W_2$. It should be appreciated, however, that the gasket 140 does not sealingly enclose the food storage chamber 100 when the outer door 102 is in the second position 720. Thus, air may exit the food storage chamber 100 to allow the air pressure within the food storage chamber 100 to reach equilibrium with the air pressure of the room or area in which the refrigerator appliance 10 is located.

Referring now to FIG. 14, when the outer door 102 is in the second position 720, the magnet 400 exerts a magnetic bias on the outer door 102 towards the inner door 105 along the transverse direction T to further compress the gasket 140. In particular, the magnetic bias moves the outer door 102 from the second position 720 to a third position 730 in which the front portion 180 of the latch 112 is spaced apart from the locking member 230, specifically the rear surface 234, along the transverse direction T. In addition, as the outer door 102 moves from the second position 720 to the third position 730, the outer door 102 further compresses the gasket 140 against the inner door 105 such that the width of the gasket 140 decreases from the second width $W_2$ (FIG. 13) to a smaller third width $W_3$. It should be appreciated that the third width $W_3$ cannot be less than a distance D defined between the front surface 508 of the cover 500 and the outer surface 128 of the inner door 105 along the transverse direction T. More specifically, in one embodiment, the distance D is equal to the thickness $T_1$ (FIG. 8) of the cover 500 and, accordingly, the third width $W_3$ cannot be less than the thickness $T_1$ of the cover 500. In alternative embodiments, the catch 200 may not include the cover 500 and, as a result, the distance D is defined between the front surface 222 of the body 210 and the outer surface 128 of the inner door 105 along the transverse direction T. Accordingly, in such embodiments, the third width $W_3$ cannot be less than the distance defined between the front surface 222 of the body 210 and the outer surface 128 of the inner door 105 along the transvers direction T. It should also be appreciated that the gasket 140 sealingly encloses the food storage chamber 100 when the outer door 102 is in the third position 720. Thus, air cannot exit the food storage chamber 100 when the outer door 102 is in the third position 730.

Referring still to FIG. 14, the magnet 400 exerts a magnetic bias on the magnetic object 652 of the latch housing 600 to further compress the gasket 140. In particular, since the magnetic object 652 is positioned within the outer door 102, it follows that the magnetic bias on the magnetic object 652 moves the magnetic object 652, and thus the outer door 102, towards the inner door 105 along the transverse direction T to further compress the gasket 140 from the second width $W_2$ to the third width $W_3$.

In alternative embodiments, the outer door 102 may not include the latch housing 600. Instead, the outer door 102 may be comprised of a ferromagnetic material (e.g., stainless steel). As such, the magnet 400 exerts a magnetic bias on the outer door 102 towards the inner door 105 along the transverse direction T to further compress the gasket 140. In particular, the magnetic bias moves the outer door 102 from the second position 720 to the third position 730 to further compresses the gasket 140 against the inner door 105 such that the width of the gasket 140 decreases from the second width $W_2$ (FIG. 13) to the third width $W_3$.

As shown, the latch 112 may move along the vertical direction V to a nominal position 112' in which the contact surface 182' is positioned between the tip region 236 of the locking member 230 and the top wall 212 of the body 210 along the vertical direction V. Accordingly, the latch 112 may move towards the nominal position 112' to compensate for misalignment of the outer door 102 relative to the inner door 105 along the vertical direction V. As an example, if a top surface of the outer door 102 is spaced apart from (e.g., positioned below) a top surface of the inner door 105 along the vertical direction V, the latch 112 may move along the vertical direction V towards the nominal position 112' and, along the way, engage the locking member 230 to lock the outer and inner doors 102, 105 together. Thus, the locking assembly 700 may remain functional despite misalignment of the outer door 102 relative to the inner door 105 along the vertical direction V.

Figure 15:
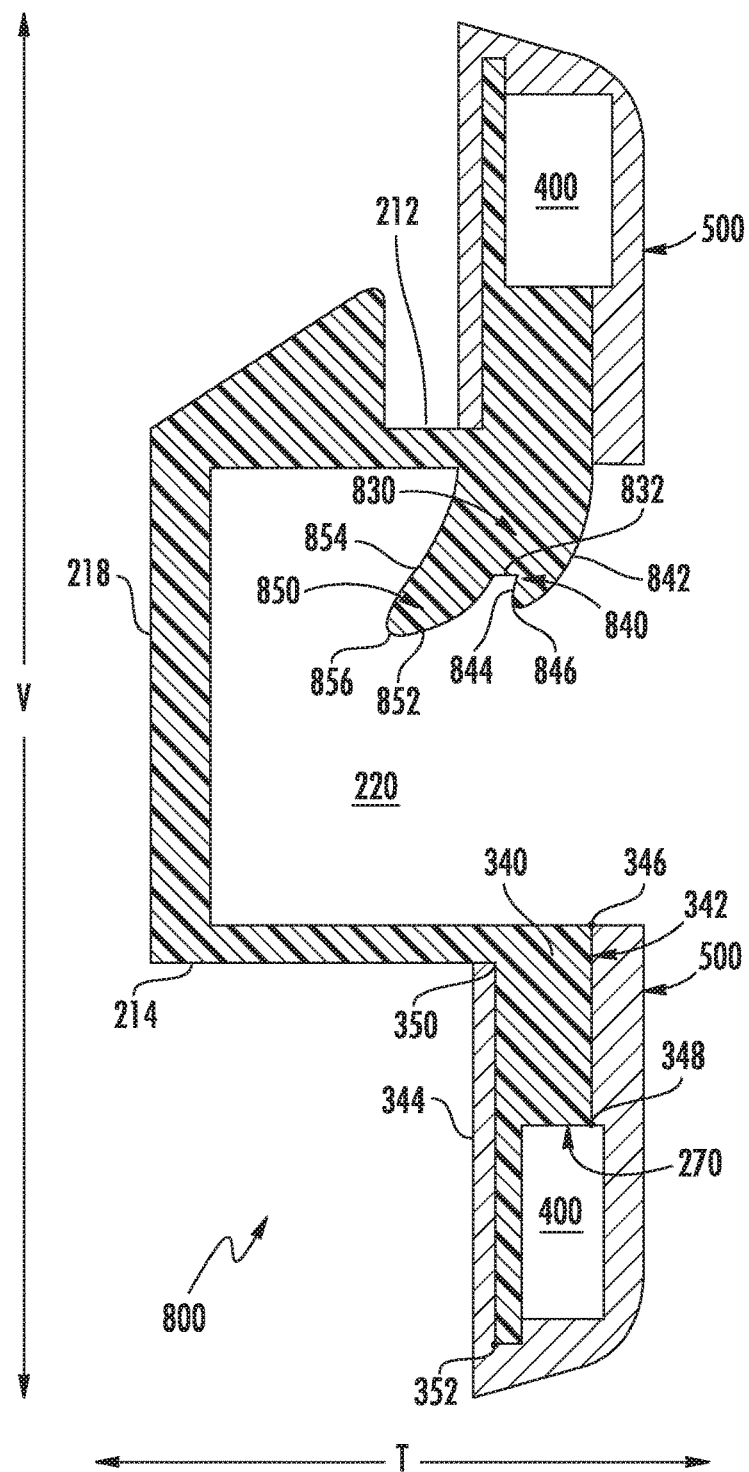
FIG. 15 provides a cross-sectional view of another catch in accordance with embodiments of the present subject matter.

FIG. 15 depicts another embodiment of a catch 800 in accordance with the present subject matter. The catch 800 of FIG. 15 may be configured in substantially the same manner as the catch 200 depicted in FIG. 8, and accordingly, the same or similar reference numbers may be used to refer to the same or similar parts. For example, the catch 800 includes a body 210 and a cover 500.

However, for the embodiment of FIG. 15, the locking member 830 defines a recess 832. As a result, the locking member 830 comprises a first locking member 840 and a second locking member 850. As shown, the first and second locking members 840, 850 are spaced apart from one another along the transverse direction T. In particular, the recess 832 is positioned between the first and second locking members 840, 850. The first locking member 840 includes a front surface 842 and a rear surface 844. The front surface 842 extends from the top wall 212 of the body 210 along the vertical direction V. In particular, the front surface 842 extends into the cavity 220. The rear surface 844 forms a portion of the recess 832 and converges with the front surface 842 to form a tip region 846. In particular, the front and rear surfaces 842, 844 of the first locking member 840 converge within the cavity 220 to form the tip region 846.

The second locking member 850 includes a front surface 852 and a rear surface 854. The front surface 852 is spaced apart from the rear surface 844 of the first locking member 840. In particular, the front surface 852 of the second locking member 850 forms a portion of the recess 832. Thus, it should be appreciated that the recess 832 may be defined between the rear surface 844 of the first locking member 840 and the front surface 852 of the second locking member 850 along the transverse direction T.

The rear surface 854 of the second locking member 850 extends from the top wall 212 of the body 210 along the vertical direction V. In particular, the rear surface 854 extends into the cavity 220. The rear surface 854 of the second locking member 850 converges with the front surface 852 of the second locking member 850 to form a tip region 856. In particular, the front and rear surfaces 852, 854 of the second locking member 850 converge within the cavity 220 to form the tip region 856. It should be appreciated that the tip region 846 of the first locking member 840 is spaced apart from the tip region 856 of the second locking member 850 along the vertical direction V.

Figure 16:
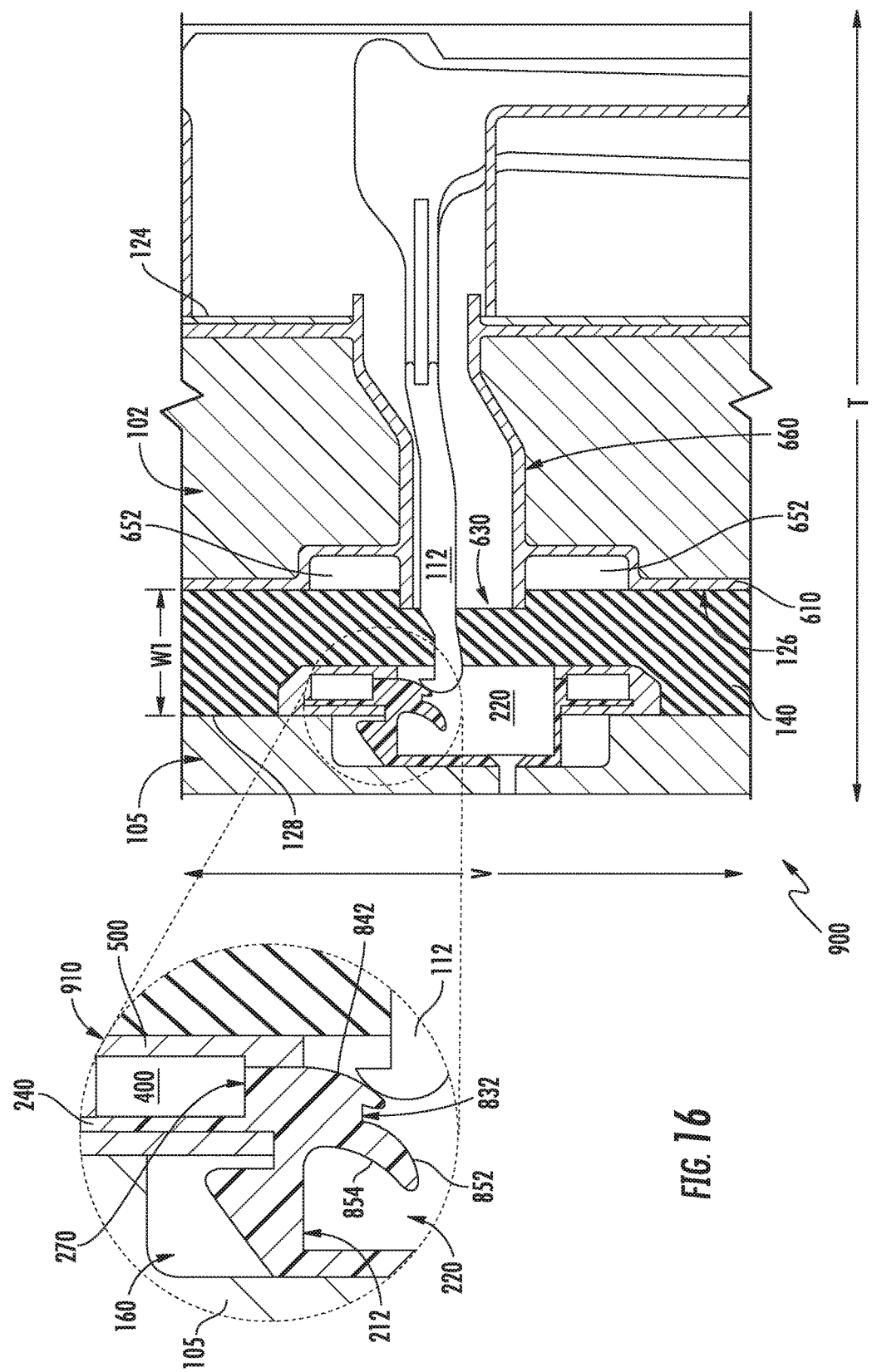
FIG. 16 provides a cross-sectional view of another locking assembly in which a latch of the locking assembly is shown in a first position.
Figure 17:
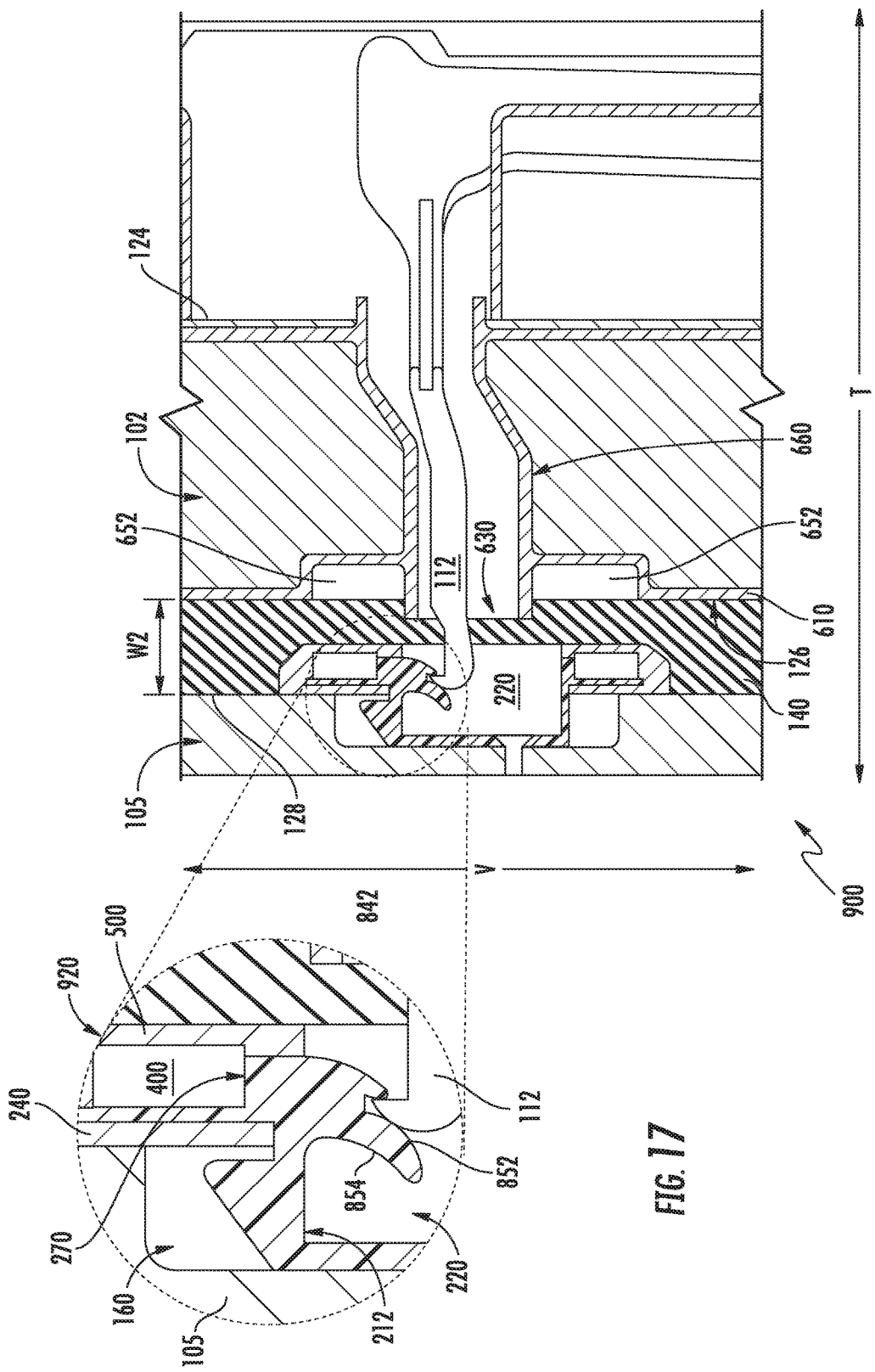
FIG. 17 provides another cross-sectional view of the locking assembly of FIG. 16 in which the latch is shown in a second position.
Figure 18:
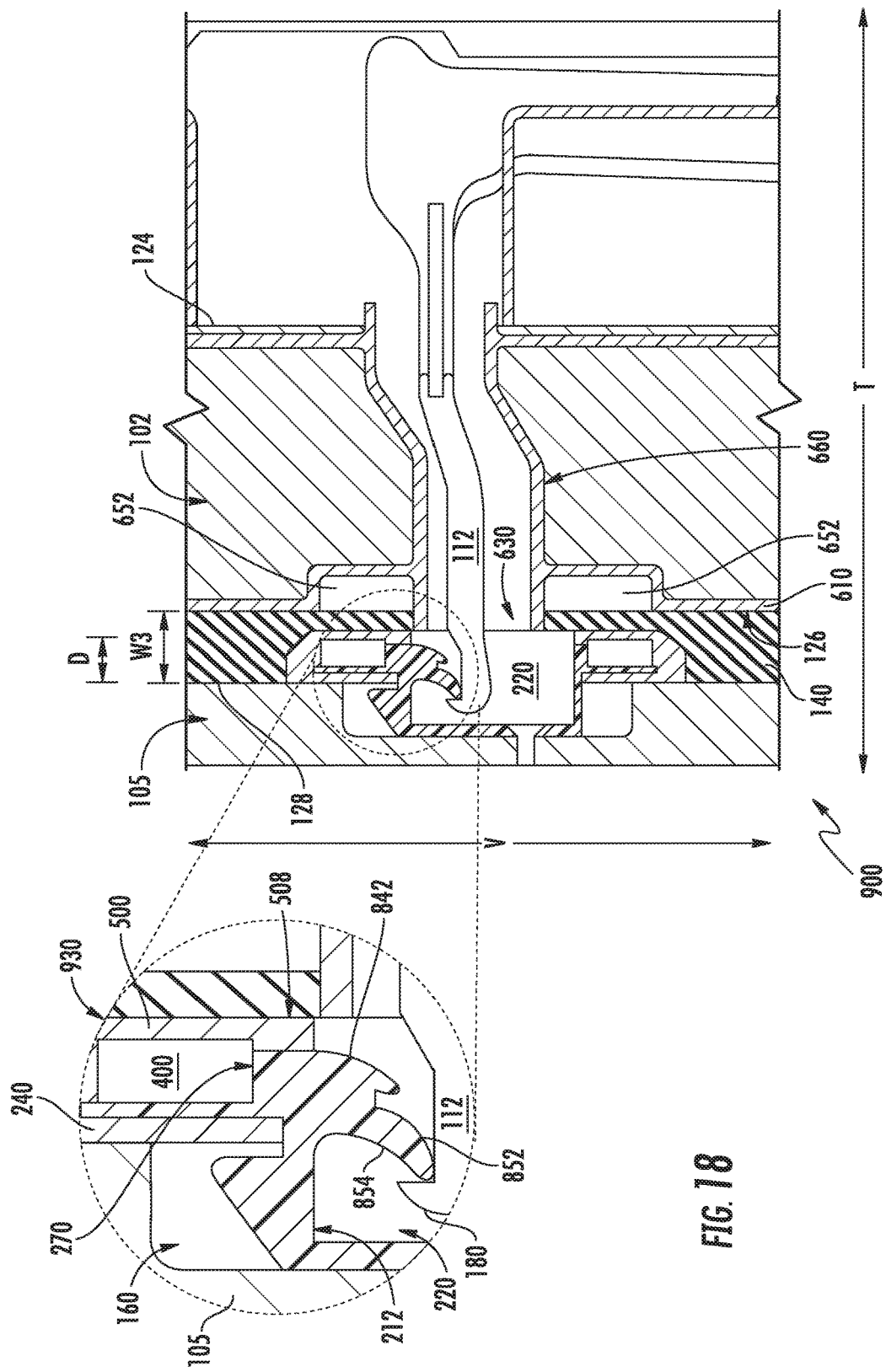
FIG. 18 provides yet another cross-sectional view of the locking assembly of FIG. 16 in which the latch is shown in a third position.

FIGS. 16-18 depict a lock assembly 900 for a door-in-door refrigerator, such as the refrigerator appliance 10 discussed above and depicted in FIGS. 4-6. In particular, the lock assembly 900 includes the latch 112, the catch 800, and the latch housing 600 discussed above. It should be appreciated that the latch 112 is configured in substantially the same manner as the latch 112 of the locking assembly 700 discussed above and depicted in FIGS. 12-14, and accordingly the same or similar reference numbers may be used to refer to the same or similar parts. As shown, the catch 800 is mounted to the inner door 105, and the latch housing 600 is mounted to the outer door 102. In particular, the outer surface 128 of the inner door 105 defines a cavity 170, and the body 210 of the catch 800 is positioned within the cavity 170. As shown, the body 210 is mounted to the inner door 105 via a mechanical fastener 170 extending through an aperture (not shown) defined by the rear wall 218 of the body 210 and a corresponding aperture (not shown) defined by the inner door 105. It should be appreciated that the corresponding aperture defined by the inner door 105 may be positioned within the cavity 160 defined by the inner door 105.

The first and second supports 240, 340 of the body 210 are positioned between the outer surface 128 of the inner door 105 and the inner surface 126 of the outer door 102 along the transverse direction T. In particular, for the embodiment depicted in FIGS. 16-18, the rear surfaces 244, 344 of the first and second supports 240, 340 are positioned against the cover 500 which, as shown, is positioned against the outer surface 128 of the inner door 105. As such, the support surface 270 of the first and second supports 240, 340 is positioned between the outer surface 128 of the inner door 105 and the inner surface 126 of the outer door 102 along the transverse direction T. In addition, the magnet 400 positioned on the support surface 270 of one or both of the first and second supports 240, 340 is positioned between the outer surface 128 of the inner door 105 and the inner surface 128 of the outer door 102 along the transverse direction T.

FIGS. 16-18 depict movement of the outer door 102 towards the inner door 105 along the transverse direction T. More specifically, FIG. 16 depicts the outer door 102 in a first position 910 in which the latch 112, specifically the front portion 180 thereof, contacts the front surface 842 of the first locking member 840. It should be appreciated, however, that the outer and inner doors 102, 105 are not locked together when the latch 112 is in the first position 910. In addition, when the outer door 102 is in the first position 910, the gasket 140 positioned on the inner surface 126 of the outer door 102 defines a first width $W_1$ along the transverse direction T. However, as the outer door 102 moves closer to the inner door 105 along the transverse direction T, it should be appreciated that the outer door 102 compresses the gasket 140 against the inner door 105. Thus, as depicted in FIGS. 17-18 and discussed below in more detail, the width of the gasket 140 decreases as the outer door 102 moves closer to the inner door 105 along the transverse direction T.

Referring now to FIG. 17, as the outer door 102 moves closer to the inner door 105 along the transverse direction T, the outer door 102 moves from the first position 910 to a second position 920 in which the latch 112 engages the first locking member 840 to lock the outer and inner doors 102, 105 together. In particular, a portion of the catch 112, specifically the front portion 180 thereof, is positioned within the recess 832 when the outer door 102 is in the second position 920. In addition, as the outer door 102 moves from the first position 910 to the second position 920, the outer door 102 compresses the gasket 140 against the inner door 105 such that the width of the gasket 140 decreases from the first width $W_1$ (FIG. 16) to a smaller second width $W_2$. It should be appreciated, however, that the gasket 140 does not sealingly enclose the food storage chamber 100 when the outer door 102 is in the second position 920. Thus, air may exit the food storage chamber 100 to allow the air pressure within the food storage chamber 100 to reach equilibrium with the air pressure of the room or area in which the refrigerator appliance 10 is located.

Referring now to FIG. 18, when the outer door 102 is in the second position 920, the magnet 400 exerts a magnetic bias on the outer door 102 towards the inner door 105 along the transverse direction T to further compress the gasket 140. In particular, the magnetic bias moves the outer door 102 from the second position 920 to a third position 930 in which the outer and inner doors 102, 105 remain locked together and the latch 112 engages the second locking member 850. In particular, as the outer door 102 moves towards the third position 930, the latch 112 disengages the first locking member 840 and travels along the front surface 852 of the second locking member 850 towards the tip region 856 thereof. As shown, the tip region 856 of the second locking member 850 is spaced apart from the tip region 846 of the first locking member 840 along the vertical direction V to delay engagement of the latch 112 and the second locking member 850. Delaying engagement of the latch 112 and second locking member 850 allows air to exit the food storage chamber 100 and, as a result, allows the air pressure within the food storage chamber 100 to reach equilibrium with the air pressure of the room or area in which the refrigerator appliance 10 is located. This reduces or eliminates the potential of the outer door 102 reopening (that is, returning to the open position) as a result of a counter force generated by a volume of compressed air exiting the food storage chamber 100.

In addition, as the outer door 102 moves from the second position 920 to the third position 930, the outer door 102 further compresses the gasket 140 against the inner door 105 such that the width of the gasket 140 decreases from the second width $W_2$ (FIG. 13) to a smaller third width $W_3$. It should be appreciated that the third width $W_3$ cannot be less than a distance D defined between the front surface 508 of the cover 500 and the outer surface 128 of the inner door 105 along the transverse direction T. More specifically, in one embodiment, the distance D is equal to the thickness $T_1$ (FIG. 8) of the cover 500 and, accordingly, the third width $W_3$ cannot be less than the thickness $T_1$ of the cover 500. In alternative embodiments, the catch 200 may not include the cover 500 and, as a result, the distance D is defined between the front surface 222 of the body 210 and the outer surface 128 of the inner door 105 along the transverse direction T. Accordingly, in such embodiments, the third width $W_3$ cannot be less than the distance defined between the front surface 222 of the body 210 and the outer surface 128 of the inner door 105 along the transvers direction T. It should also be appreciated that the gasket 140 sealingly encloses the food storage chamber 100 when the outer door 102 is in the third position 920. Thus, air cannot exit the food storage chamber 100 when the outer door 102 is in the third position 730.

Referring still to FIG. 18, the magnet 400 exerts a magnetic bias on the magnetic object 652 of the latch housing 600 to further compress the gasket 140. In particular, since the magnetic object 652 is positioned within the outer door 102, it follows that the magnetic bias on the magnetic object 652 moves the magnetic object 652, and thus the outer door 102, towards the inner door 105 along the transverse direction T to further compress the gasket 140 from the second width $W_2$ to the third width $W_3$.

In alternative embodiments, the outer door 102 may not include the latch housing 600. Instead, the outer door 102 may be comprised of a ferromagnetic material (e.g., stainless steel). In such embodiments, the magnet 400 exerts a magnetic bias on the outer door 102 towards the inner door 105 along the transverse direction T to further compress the gasket 140. In particular, the magnetic bias moves the outer door 102 from the second position 920 to the third position 930 to further compresses the gasket 140 against the inner door 105 such that the width of the gasket 140 decreases from the second width $W_2$ (FIG. 17) to the third width $W_3$. It should be appreciated that the gasket 140 sealingly encloses the food storage chamber 100 when the outer door 102 is in the third position 930.

It should be appreciated that the latch 112 of the locking assembly 900 may move the vertical direction V to the nominal position 112' depicted in FIG. 12. More specifically, when the latch 112 is in the nominal position 112', the contact surface 182' is positioned between the tip region 846, 856 of the first and second locking members 840, 850 and the top wall 212 of the body 210 along the vertical direction V. Accordingly, the latch 112 may move towards the nominal position 112' to compensate for misalignment of the outer door 102 relative to the inner door 105 along the vertical direction V. As an example, if a top surface of the outer door 102 is spaced apart from (e.g., positioned below) a top surface of the inner door 105 along the vertical direction V, the latch 112 may move along the vertical direction V towards the nominal position 112' and, along the way, engage either the first locking member 840 or the second locking member 850 to lock the outer and inner doors 102, 105 together. Thus, the locking assembly 900 may remain functional despite misalignment of the outer door 102 relative to the inner door 105 along the vertical direction V.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A refrigerator appliance defining a vertical direction, a lateral direction, and a transverse direction, the vertical, lateral, and transverse directions being mutually perpendicular, the refrigerator appliance comprising:
    a cabinet defining a food storage chamber;
    an inner door rotatably hinged to the cabinet, the inner door movable between an open position and a closed position to permit selective access to the food storage chamber, the inner door comprising an inner surface and an outer surface spaced apart from one another along the transverse direction;
    an outer door rotatably hinged to the inner door, the outer door movable between an open position and a closed position, the outer door comprising an inner surface and an outer surface spaced apart from one another along the transverse direction;
    a gasket operable to seal against the outer surface of the inner door or the inner surface of the outer door, the gasket defining a width along the transverse direction; and
    a locking assembly for securing the outer door in the closed position, the locking assembly comprising:
        a catch comprising a body mounted to the inner door, the body comprising a support surface and a locking member, the support surface positioned between the outer surface of the inner door and the inner surface of the outer door along the transverse direction, the locking member comprising a first locking member and a second locking member;
        a latch coupled to the outer door, the latch operable to engage the first and second locking members; and
        a magnet positioned on the support surface, the magnet operable to exert a magnetic bias on the outer door towards the inner door along the transverse direction to compress the gasket,
    wherein when the latch engages the first locking member, the gasket is compressed such that the width of the gasket decreases from a first width to a second width, and
    wherein when the latch engages the second locking member, the gasket is compressed such that the width of the gasket decreases from the second width to a third width.

2. The refrigerator appliance of claim 1, wherein the support surface extends along a plane that is perpendicular to the vertical direction.

3. The refrigerator appliance of claim 1, wherein the catch includes a cover attached to the body, the cover comprising a front surface positioned between the outer surface of the inner door and the inner surface of the outer door along the transverse direction.

4. The refrigerator appliance of claim 3, wherein the latch engages the second locking member while the width of the gasket is equal to the third width, and wherein the third width cannot be less than a distance defined between the front surface of the cover and the outer surface of the inner door along the transverse direction.

5. The refrigerator appliance of claim 1, wherein the first locking member is spaced apart from the second locking member along the transverse direction.

6. The refrigerator appliance of claim 5, wherein a tip region of the first locking member is spaced apart from a tip region of the second locking member along the vertical direction.

7. The refrigerator appliance of claim 6, wherein the latch travels along a front surface of the second locking member while the width of the gasket is being compressed from the second width to the third width.

8. The refrigerator appliance of claim 7, wherein the gasket does not sealingly enclose the food storage chamber when the width of the gasket is equal to the second width, and wherein the gasket does sealingly enclose the food storage chamber when the width of the gasket is equal to the third width.

9. The refrigerator appliance of claim 6, wherein the body defines a cavity into which the first and second locking members extend along the vertical direction, wherein the tip region of both the first and second locking members is positioned within the cavity and spaced apart from a top wall of the cavity along the vertical direction, and wherein the latch is movable along the vertical direction to a nominal position in which a contact surface of the latch is positioned between the tip region and the top wall along the vertical direction.

10. The refrigerator appliance of claim 1, wherein the locking assembly further includes a latch housing comprising a panel and a magnetic object, the panel positioned within the outer door such that the panel is proximate to the inner surface of the outer door, the first panel defining a cavity into which the magnetic object is disposed.

11. A refrigerator appliance defining a vertical direction, a lateral direction, and a transverse direction, the vertical, lateral, and transverse directions being mutually perpendicular, the refrigerator appliance comprising:
- a cabinet defining a food storage chamber;
- an inner door rotatably hinged to the cabinet, the inner door movable between an open position and a closed position to permit selective access to the food storage chamber, the inner door comprising an inner surface and an outer surface spaced apart from one another along the transverse direction;
- an outer door rotatably hinged to the inner door, the outer door movable between an open position and a closed position, the outer door comprising an inner surface and an outer surface spaced apart from one another along the transverse direction;
- a gasket operable to seal against the outer surface of the inner door or the inner surface of the outer door, the gasket defining a width along the transverse direction; and
- a locking assembly for securing the outer door in the closed position, the locking assembly comprising:
  - a catch mounted to the inner door, the catch comprising a first locking member and a second locking member;
  - a latch coupled to the outer door, the latch operable to engage the first locking member and the second locking member; and
  - a magnet positioned on a support surface of the catch, the magnet operable to exert a magnetic bias on the outer door towards the inner door along the transverse direction to compress the gasket,
- wherein when the latch engages the first locking member, the gasket is compressed such that the width of the gasket decreases from a first width to a second width, and
- wherein when the latch engages the second locking member, the gasket is compressed such that the width of the gasket decreases from the second width to a third width.

12. The refrigerator appliance of claim 11, wherein the support surface of the catch is positioned between the outer surface of the inner door and the inner surface of the outer door along the transverse direction.

\* \* \* \* \*